United States Patent
Jang et al.

(10) Patent No.: US 12,242,034 B2
(45) Date of Patent: Mar. 4, 2025

(54) IMAGING LENS SYSTEM

(71) Applicant: Samsung Electro-Mechanics Co., Ltd., Suwon-si (KR)

(72) Inventors: Sang Hyun Jang, Suwon-si (KR); Ju Hwa Son, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 498 days.

(21) Appl. No.: 17/522,168

(22) Filed: Nov. 9, 2021

(65) Prior Publication Data

US 2023/0003978 A1  Jan. 5, 2023

(30) Foreign Application Priority Data

Jul. 5, 2021 (KR) .................. 10-2021-0087917

(51) Int. Cl.
  *G02B 9/64* (2006.01)
  *G02B 13/00* (2006.01)
  *G02B 27/00* (2006.01)

(52) U.S. Cl.
  CPC ........... *G02B 13/0045* (2013.01); *G02B 9/64* (2013.01); *G02B 27/0025* (2013.01)

(58) Field of Classification Search
  CPC .. G02B 13/0045; G02B 9/64; G02B 27/0025; G02B 13/04; G02B 13/0015; G02B 13/06; G02B 3/0087; G02B 13/18; G02B 2003/0093; G03B 30/00
  See application file for complete search history.

(56) References Cited

U.S. PATENT DOCUMENTS

| | | | | |
|---|---|---|---|---|
| 10,133,036 | B1* | 11/2018 | Wang | G02B 9/64 |
| 11,415,778 | B2 | 8/2022 | Jhang et al. | |
| 11,921,353 | B2* | 3/2024 | Huh | G02B 9/64 |
| 2014/0376105 | A1* | 12/2014 | Sekine | G02B 3/02 |
| | | | | 359/708 |

(Continued)

FOREIGN PATENT DOCUMENTS

| | | |
|---|---|---|
| CN | 111538136 A | 8/2020 |
| CN | 112346221 A | 2/2021 |

(Continued)

OTHER PUBLICATIONS

Gross, Wiley-VCH Verlag Gmbh & Co. KGaA, vol. 3, pp. 378-379 (Year: 2007).*

(Continued)

*Primary Examiner* — Marin Pichler
*Assistant Examiner* — Mackenzi Waddell
(74) *Attorney, Agent, or Firm* — NSIP Law

(57) ABSTRACT

An imaging lens system includes a first lens; a second lens; a third lens having a concave object-side surface in a paraxial region thereof; a fourth lens; a fifth lens; a sixth lens; and a seventh lens, wherein the first to seventh lenses are sequentially disposed in ascending numerical order along an optical axis of the imaging lens system from an object side of the imaging lens system toward an imaging plane of the imaging lens system, and the conditional expression TTL/(2*ImgHT)<0.6 is satisfied, where TTL is a distance along the optical axis from an object-side surface of the first lens to the imaging plane, and 2*ImgHT is a diagonal length of an effective imaging area of the imaging plane.

19 Claims, 10 Drawing Sheets

(56) References Cited

U.S. PATENT DOCUMENTS

| | | | |
|---|---|---|---|
| 2017/0357081 A1* | 12/2017 | Dai | G02B 9/64 |
| 2018/0024322 A1 | 1/2018 | Chen et al. | |
| 2019/0056569 A1* | 2/2019 | Yoo | G02B 9/64 |
| 2019/0154972 A1 | 5/2019 | Zhang et al. | |
| 2020/0393649 A1* | 12/2020 | Shin | G02B 9/60 |
| 2021/0033821 A1 | 2/2021 | Fukaya | |
| 2021/0063696 A1 | 3/2021 | Kamada et al. | |
| 2021/0132340 A1 | 5/2021 | Wang et al. | |
| 2021/0149155 A1 | 5/2021 | Huang | |
| 2021/0149162 A1* | 5/2021 | Jhang | G02B 27/005 |
| 2021/0149166 A1 | 5/2021 | Zhang et al. | |
| 2021/0157101 A1 | 5/2021 | Yunbai | |
| 2021/0263275 A1* | 8/2021 | Yang | G02B 13/0045 |
| 2021/0373293 A1 | 12/2021 | Zhang et al. | |
| 2022/0011541 A1* | 1/2022 | Sun | G02B 9/64 |

FOREIGN PATENT DOCUMENTS

| | | |
|---|---|---|
| CN | 112612119 A | 4/2021 |
| CN | 112748536 A | 5/2021 |
| JP | 2020-67525 A | 4/2020 |
| JP | 2020-187221 A | 11/2020 |
| JP | 2021-32935 A | 3/2021 |
| TW | 1664466 B | 7/2019 |
| TW | I715319 B | 1/2021 |
| TW | 202119085 A | 5/2021 |
| TW | 202119088 A | 5/2021 |

OTHER PUBLICATIONS

Taiwanese Office Action issued on Mar. 30, 2023, in counterpart Taiwanese Patent Application No. 110142394 (6 pages in English, 9 pages in Chinese).

Indian Office Action Issued on Feb. 9, 2023, in counterpart Indian Patent Application No. 202114051711 (6 Pages in English).

Taiwanese Office Action issued on Jul. 25, 2022, in counterpart Taiwanese Patent Application No. 110142394 (6 pages in English and 7 pages in Chinese).

Korean Office Action Issued on Jan. 8, 2024, in counterpart Korean Patent Application No. 10-2021-0087917 (7 pages in English, 6 pages in Korean).

Taiwanese Office Action issued on Jan. 7, 2025, in counterpart Taiwanese Patent Application No. 113103515 (5 pages in English, 6 pages in Chinese).

* cited by examiner

IMAGING LENS SYSTEM

CROSS-REFERENCE TO RELATED APPLICATIONS

This application claims the benefit under 35 USC 119(a) of Korean Patent Application No. 10-2021-0087917 filed on Jul. 5, 2021, in the Korean Intellectual Property Office, the entire disclosure of which is incorporated herein by reference for all purposes.

BACKGROUND

1. Field

This application discloses an imaging lens system having a wide field of view.

2. Description of Related Art

A portable electronic device may include a camera module for capturing an image or a video. For example, a camera module may be mounted in a mobile phone, a laptop, a gaming device, or various other electronic devices.

The resolution of a camera module including an imaging lens system may be proportional to a size of a sensor and an imaging plane. For example, to implement a high-resolution camera module including an imaging lens system, a sensor and an imaging plane of a considerable size may be necessary. However, since the size (or length) of the camera module and the imaging lens system increases in proportion to the size of the sensor and the imaging plane, it may be difficult to mount the high-resolution camera module and the imaging lens system in a thin electronic device such as a smartphone.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens; a second lens; a third lens having a concave object-side surface in a paraxial region thereof; a fourth lens; a fifth lens; a sixth lens; and a seventh lens, wherein the first to seventh lenses are sequentially disposed in ascending numerical order along an optical axis of the imaging lens system from an object side of the imaging lens system toward an imaging plane of the imaging lens system, and the conditional expression $TTL/(2*ImgHT)<0.6$ is satisfied, where TTL is a distance along the optical axis from an object-side surface of the first lens to the imaging plane, and $2*ImgHT$ is a diagonal length of an effective imaging area of the imaging plane.

A field of view of the imaging lens system may be 84 degrees or more.

An f-number of the imaging lens system may be less than 1.9.

The conditional expression $0.7<TTL/f<1.2$ may be satisfied, where f is a focal length of the imaging lens system.

The conditional expression $0.1<D34/D67<0.3$ may be satisfied, where D34 is a distance along the optical axis from an image-side surface of the third lens to an object-side surface of the fourth lens, and D67 is a distance along the optical axis from an image-side surface of the sixth lens to an object-side surface of the seventh lens.

The conditional expression $0.4<R1/R11<0.8$ may be satisfied, where R1 is a radius of curvature on the optical axis of the object-side surface of the first lens, and R11 is a radius of curvature on the optical axis of an object-side surface of the sixth lens.

The conditional expression $-0.8<(R11-R12)/(R11+R12)<-0.1$ may be satisfied, where R11 is a radius of curvature on the optical axis of an object-side surface of the sixth lens, and R12 is a radius of curvature on the optical axis of an image-side surface of the sixth lens.

The conditional expression $0.4<(R3-R4)/(R3+R4)<0.6$ may be satisfied, where R3 is a radius of curvature on the optical axis of an object-side surface of the second lens, and R4 is a radius of curvature on the optical axis of an image-side surface of the second lens.

The conditional expression $0.1<(R12*D56)/(f*ImgHT)<0.3$ may be satisfied, where R12 is a radius of curvature on the optical axis of an image-side surface of the sixth lens, D56 is a distance along the optical axis from an image-side surface of the fifth lens to an object-side surface of the sixth lens, f is a focal length of the imaging lens system, and ImgHT is a maximum effective image height on the imaging plane.

The conditional expression $1.0<(V4+V5)/V3<2.0$ may be satisfied, where V3 is an Abbe number of the third lens, V4 is an Abbe number of the fourth lens, and V5 is an Abbe number of the fifth lens.

In another general aspect, an imaging lens system includes a first lens having a refractive power; a second lens having a refractive power; a third lens having a positive refractive power, and a concave object-side surface in a paraxial region thereof; a fourth lens having a refractive power; a fifth lens having a refractive power; a sixth lens having a refractive power; and a seventh lens having a convex object-side surface in a paraxial region thereof, wherein the first lens to the seventh lens are sequentially disposed spaced apart from each other in ascending numerical order along an optical axis of the imaging lens system from an object side of the imaging lens system toward an imaging plane of the imaging lens system, and the conditional expression $0.7<TTL/f<1.2$ is satisfied, where TTL is a distance along the optical axis from an object-side surface of the first lens to the imaging plane, and f is a focal length of the imaging lens system.

The third lens may have a convex image-side surface in a paraxial region thereof.

The fourth lens may have a concave object-side surface in a paraxial region thereof.

The fourth lens may have a concave image-side surface in a paraxial region thereof.

The fourth lens may have a negative refractive power.

The sixth lens may have a concave image-side surface in a paraxial region thereof.

In another general aspect, an imaging lens system includes a first lens; a second lens; a third lens; a fourth lens; a fifth lens; a sixth lens; and a seventh lens, wherein the first to seventh lenses are sequentially disposed in ascending numerical order along an optical axis of the imaging lens system from an object side of the imaging lens system toward an imaging plane of the imaging lens system, and the conditional expression $TTL/(2*ImgHT)<0.6$ is satisfied, where TTL is a distance along the optical axis from an object-side surface of the first lens to the imaging plane, and $2*ImgHT$ is a diagonal length of an effective imaging area of the imaging plane, and the imaging lens system has any one or any combination of any two or more of the following features: the third lens has a positive refractive power, the third lens has a convex image-side surface in a paraxial region thereof; the fourth lens has a negative refractive power; and the seventh lens has a convex object-side surface in a paraxial region thereof.

A field of view of the imaging lens system may be 84 degrees or more.

An f-number of the imaging lens system may be less than 1.9.

The conditional expression $0.7<TTL/f<1.2$ may be satisfied, where f is a focal length of the imaging lens system.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
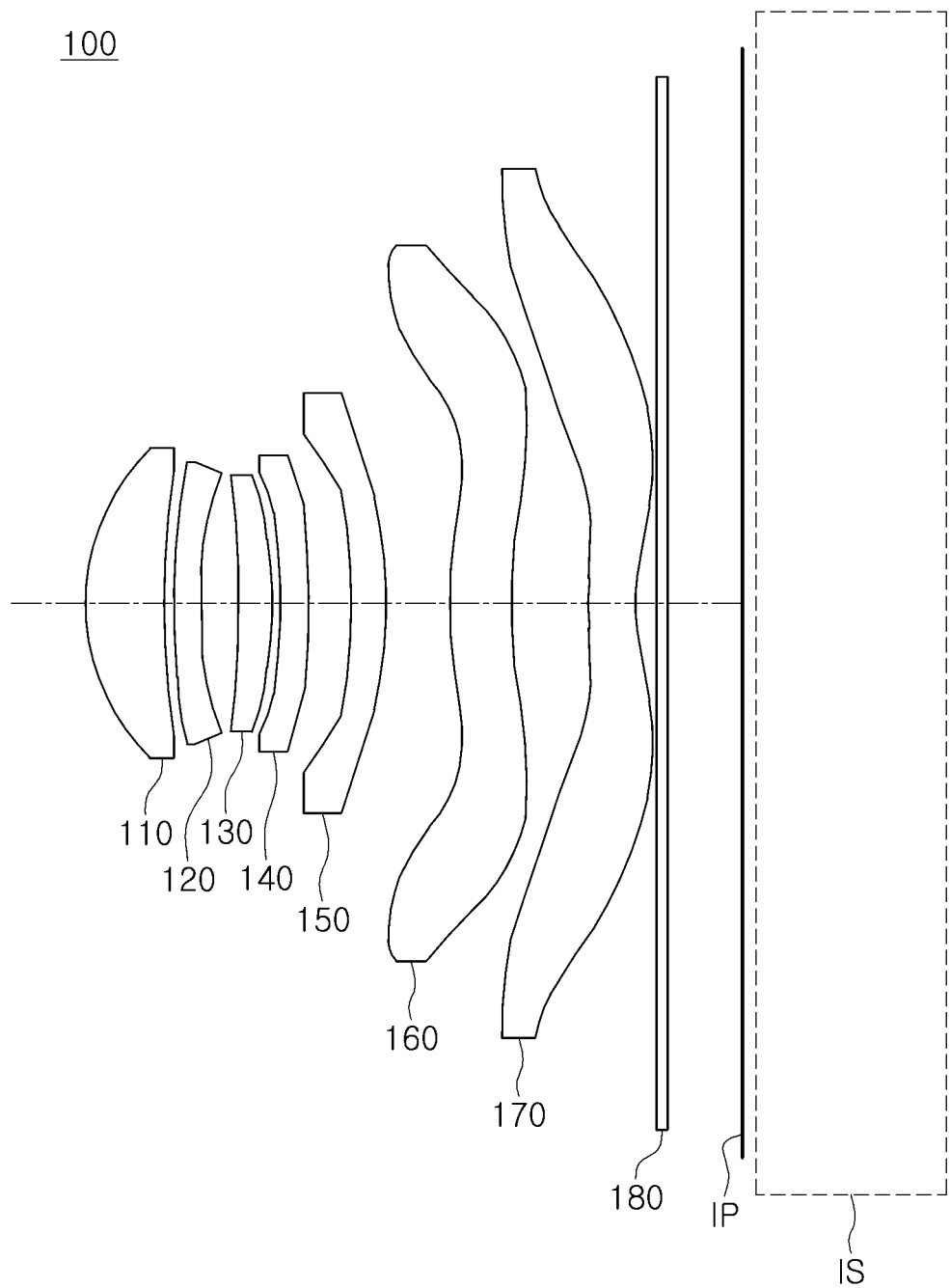
FIG. 1 is a diagram illustrating a first example of an imaging lens system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

In the drawings, thicknesses, sizes, and shapes of lenses may have been slightly exaggerated for convenience of explanation. In particular, shapes of spherical surfaces or aspherical surfaces illustrated in the drawings are illustrated by way of example. That is, the shapes of the spherical surfaces or the aspherical surfaces are not limited to those illustrated in the drawings.

In the examples described herein, a first lens refers to a lens closest to an object (or a subject), and a seventh lens refers to a lens closest to an imaging plane (or an image sensor).

In the examples, a unit of radiuses of curvature of lens surfaces, thicknesses of lenses and other optical elements, gaps between lenses and other optical elements, TTL (a distance from an object-side surface of the first lens to the imaging plane), 2*ImgHT (a diagonal length of an effective imaging area of the imaging plane), ImgHT (a maximum effective image height on the imaging plane, which is equal to one half of the diagonal length of the effective imaging area of the imaging plane, i.e., one half of 2*ImgHT), and focal lengths are expressed in millimeters (mm).

Thicknesses of lenses and other optical elements, gaps between lenses and other optical elements, and TTL are measured along an optical axis of the imaging lens system.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

An effective aperture radius or effective radius of a lens surface is a radius of a portion of the lens surface through which light actually passes, and is not necessarily a radius of an outer edge of the lens surface. Stated another way, the effective aperture radius or effective radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses or effective radiuses.

An entrance pupil of an imaging lens system is an image of an aperture stop of the imaging lens system seen from the object side of the imaging lens system. The exit pupil of the imaging lens system is an image of the aperture stop seen from the image side of the imaging lens system.

An image-side maximum chief ray angle (max CRA) of an imaging lens system is an angle between an optical axis of the imaging lens system and a ray that passes through the center of the exit pupil of the imaging lens system and is incident on a corner of the effective imaging area of the imaging plane.

A first example of the imaging lens system may include seven lenses. For example, the imaging lens system may include a first lens, a second lens, a third lens, a fourth lens, a fifth lens, a sixth lens, and a seventh sequentially disposed in ascending numerical order along an optical axis of the imaging lens system from an object side of the imaging lens system toward an imaging plane of the imaging lens system.

The imaging lens system in the first example may include a lens having a concave object-side surface. For example, in the imaging lens system in the first example, the third lens may have a concave object-side surface.

A second example of an imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, and may satisfy a predetermined conditional expression. For example, the imaging lens system may satisfy the conditional expression TTL/(2*ImgHT)<0.6. In the conditional expression, TTL is a distance from an object-side surface of the first lens to the imaging plane, and 2*ImgHT is a diagonal length of an effective imaging area of the imaging plane.

A third example of the imaging lens system may include both the features of the first example and the second example. For example, the imaging lens system in the third example may include a first lens, a second lens, a third lens, a fourth lens, a fifth lens, a sixth lens, and a seventh lens sequentially disposed in ascending numerical order along an optical axis of the imaging lens system from an object side of the imaging lens toward an imaging plane of the imaging lens system, and may satisfy the conditional expression TTL/(2*ImgHT)<0.6. Also, in the imaging lens system in the third example, the third lens may have a concave object-side surface.

A fourth example of the imaging lens system may further include other features in addition to the features of the first example. For example, the imaging lens system in the fourth example may further include a third lens having a positive refractive power and a seventh lens having a convex object-side surface. Also, the imaging lens system in the fourth example may satisfy the conditional expression 0.7<TTL/f<1.2. In the conditional expression, f is a focal length of the imaging lens system.

A fifth example of the imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system. Also, the imaging lens system in the fifth example may include a lens having a negative refractive power. For example, in the imaging lens system in the fifth example, the fourth lens may have a negative refractive power.

Another example of an imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, and may satisfy any one or any combination of any two or more of Conditional Expressions 1 to 8 below.

$84° \leq FOV$ (Conditional Expression 1)

$f\text{-number} < 1.9$ (Conditional Expression 2)

| | |
|---|---|
| $0.1 < D34/D67 < 0.3$ | (Conditional Expression 3) |
| $0.4 < R1/R11 < 0.8$ | (Conditional Expression 4) |
| $-0.8 < (R11-R12)/(R11+R12) < 0.6$ | (Conditional Expression 5) |
| $0.4 < (R3-R4)/(R3+R4) < 0.6$ | (Conditional Expression 6) |
| $0.1 < (R12*D56)/(f*ImgHT) < 0.3$ | (Conditional Expression 7) |
| $1.0 < (V4+V5)/V3 < 2.0$ | (Conditional Expression 8) |

In the above conditional expressions, FOV is a field of view of the imaging lens system and is expressed in degrees, f-number is equal to a focal length f of the imaging lens system divided by an entrance pupil diameter of the imaging lens system and is a dimensionless quantity, D34 is a distance along the optical axis from an image-side surface of the third lens to an object-side surface of the fourth lens, D56 is a distance along the optical axis from an image-side surface of the fifth lens to an object-side surface of the sixth lens, D67 is a distance along the optical axis from an image-side surface of the sixth lens to an object-side surface of the seventh lens, R1 is a radius of curvature on the optical axis of an object-side surface of the first lens, R3 is a radius of curvature on the optical axis of an object-side surface of the second lens, R4 is a radius of curvature on the optical axis of an image-side surface of the second lens, R11 is a radius of curvature on the optical axis of the object-side surface of the sixth lens, R12 is a radius of curvature on the optical axis of the image-side surface of the sixth lens, ImgHT is a maximum effective image height on the imaging (equal to one half of a diagonal length of an effective imaging area of the imaging plane), V3 is an Abbe number of the third lens, V4 is an Abbe number of the fourth lens, and V5 is an Abbe number of the fifth lens.

Another example of an imaging lens system may include a first lens, a second lens, a third lens, a fourth lens, a fifth lens, a sixth lens, and a seventh lens sequentially disposed in ascending numerical order from an object side of the imaging lens system toward an imaging plane of the imaging lens system, and may satisfy any one or any combination of any two or more of Conditional Expressions 9 to 11 below.

| | |
|---|---|
| $84° < FOV < 100°$ | (Conditional Expression 9) |
| $1.2 \leq f\text{-number} < 1.9$ | (Conditional Expression 10) |
| $0.4 < TTL/(2*ImgHT) < 0.6$ | (Conditional Expression 11) |

The imaging lens system according to the aforementioned examples may include one or more lenses having the following features, if desired. For example, the imaging lens system in the first example may include one of the first to seventh lenses having the following features. As another example, the imaging lens system in the second example may include two or more of the first to seventh lenses having the following features. However, the imaging lens system may not necessarily include a lens having the following features.

Hereinafter, the first to seventh lenses will be described in greater detail.

The first lens may have a refractive power. For example, the first lens may have a positive refractive power. One surface of the first lens may be convex. For example, the first lens may have a convex object-side surface. The first lens may include a spherical surface or an aspherical surface. For example, both surfaces of the first lens may be aspherical. The first lens may be made of a material having high light transmissivity and excellent workability. For example, the first lens may be made of a plastic material or a glass material. The first lens may have a predetermined refractive index. For example, the refractive index of the first lens may be less than 1.6. As another example, the refractive index of the first lens may be greater than 1.50 and less than 1.60. The first lens may have a predetermined Abbe number. For example, the Abbe number of the first lens may be less than 60. As another example, the Abbe number of the first lens may be greater than 50 and less than 60.

The second lens may have a refractive power. For example, the second lens may have a negative refractive power. One surface of the second lens may be convex. For example, the second lens may have a convex object-side surface. The second lens may include a spherical surface or an aspherical surface. For example, both surfaces of the second lens may be aspherical. The second lens may be made of a material having high light transmissivity and excellent workability. For example, the second lens may be made of a plastic material or a glass material. The second lens may have a refractive index larger than that of the first lens. For example, the refractive index of the second lens may be greater than 1.6. As another example, the refractive index of the second lens may be greater than 1.60 and less than 1.70. The second lens may have a predetermined Abbe number. For example, the Abbe number of the second lens may be less than 22. As another example, the Abbe number of the second lens may be greater than 17 and less than 22.

The third lens may have a refractive power. For example, the third lens may have a positive refractive power. One surface of the third lens may be convex. For example, the third lens may have a convex image-side surface. The third lens may include a spherical surface or an aspherical surface. For example, both surfaces of the third lens may be aspherical. The third lens may be made of a material having high light transmissivity and excellent workability. For example, the third lens may be made of a plastic material. The third lens may have a refractive index smaller than that of the second lens. For example, the refractive index of the third lens may be less than 1.6. As another example, the refractive index of the third lens may be greater than 1.5 and less than 1.6. The third lens may have a predetermined Abbe number. For example, the Abbe number of the third lens may be less than 40. As another example, the Abbe number of the third lens may be greater than 20 and less than 40.

The fourth lens may have a refractive power. For example, the fourth lens may have a negative refractive power. At least one surface of the fourth lens may be concave. For example, the fourth lens may have a concave object-side surface, or a concave image-side surface, or both a concave object-side surface and a concave image-side surface. The fourth lens may include a spherical surface or an aspherical surface. For example, both surfaces of the fourth lens may be aspherical. The fourth lens may be made of a material having high light transmissivity and excellent workability. For example, the fourth lens may be made of a plastic material. The fourth lens may be configured to have a refractive index greater than that of the adjacent third and fifth lenses. For example, the refractive index of the fourth lens may be greater than 1.65. As another example, the refractive index of the fourth lens may be greater than 1.65 and less than 1.72. The fourth lens may have a predetermined Abbe number. For example, the Abbe number of the fourth lens may be less than 30. As another example, the Abbe number of the fourth lens may be greater than 18 and less than 23.

The fifth lens may have a refractive power. For example, the fifth lens may have a positive refractive power or a negative refractive power. One surface of the fifth lens may be convex. For example, the fifth lens may have a convex object-side surface or a concave image-side surface. The fifth lens may include a spherical surface or an aspherical surface. For example, both surfaces of the fifth lens may be aspherical. The fifth lens may be made of a material having high light transmissivity and excellent workability. For example, the fifth lens may be made of a plastic material. The fifth lens may be configured to have a refractive index larger than that of the sixth lens. For example, the refractive index of the fifth lens may be greater than 1.55. As another example, the refractive index of the fifth lens may be greater than 1.55 and less than 1.65. The fifth lens may have a predetermined Abbe number. For example, the Abbe number of the fifth lens may be less than 40. As another example, the Abbe number of the fifth lens may be greater than 20 and less than 40.

The sixth lens may have a refractive power. For example, the sixth lens may have a positive refractive power. One surface of the sixth lens may be concave. For example, the sixth lens may have a concave image-side surface. The sixth lens may include an aspherical surface. For example, both surfaces of the sixth lens may be aspherical. The sixth lens may be configured so that a central portion and a peripheral portion of either one or both of an object-side surface and an image-side surface of the sixth lens may have different shapes. For example, the object-side surface of the sixth lens may have a convex central portion and a concave peripheral portion. As another example, the image-side surface of the sixth lens may have a concave central portion and a convex peripheral portion. Either one or both of the object-side surface and the image-side surface of the sixth lens may have an inflection point at which a shape of the surface changes from convex to concave, or from concave to convex. The sixth lens may be made of a material having high light transmissivity and excellent workability. For example, the sixth lens may be made of a plastic material. The sixth lens may be configured to have a predetermined refractive index. For example, the refractive index of the sixth lens may be less than 1.55. As another example, the refractive index of the sixth lens may be greater than 1.5 and less than 1.55. The sixth lens may have a predetermined Abbe number. For example, the Abbe number of the sixth lens may be greater than 50. As another example, the Abbe number of the sixth lens may be greater than 50 and less than 60.

The seventh lens may have a refractive power. For example, the seventh lens may have a negative refractive power. One surface of the seventh lens may be convex. For example, the seventh lens may have a convex object-side surface. The seventh lens may include an aspherical surface. For example, both surfaces of the seventh lens may be aspherical. The seventh lens may be configured so that a central portion and a peripheral portion of either one or both of an object-side surface and an image-side surface of the seventh lens may have different shapes. For example, the object-side surface of the seventh lens may have a convex central portion and a concave peripheral portion. As another example, the image-side surface of the seventh lens may have a concave central portion and a convex peripheral portion. Either one or both of the object-side surface and the image-side surface of the seventh lens may have an inflection point at which a shape of the surface changes from convex to concave, or from concave to convex. The seventh lens may be made of a material having high light transmissivity and excellent workability. For example, the seventh lens may be made of a plastic material. The seventh lens may be configured to have a predetermined refractive index. For example, the refractive index of the seventh lens may be less than 1.6. As another example, the refractive index of the seventh lens may be greater than 1.5 and less than 1.6. The seventh lens may have a predetermined Abbe number. For example, the Abbe number of the seventh lens may be greater than 50. As another example, the Abbe number of the seventh lens may be greater than 50 and less than 60.

The first to seventh lenses may include a spherical surface or an aspherical surface as described above. The aspherical surface of the lens may be represented by Equation 1 below.

$$Z = \frac{cr^2}{1+\sqrt{1-(1+k)c^2r^2}} + Ar^4 + Br^6 + Cr^8 + Dr^{10} + Er^{12} + \\ Fr^{14} + Gr^{16} + Hr^{18} + Jr^{20} + Lr^{22} + Mr^{24} + Nr^{26} + Or^{26} + Pr^{30} \qquad (1)$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A, B, C, D, E, F, G, H, J, L, M, N, O, and P are aspherical constants, and Z (or sag) is a distance in a direction parallel to the optical axis of the lens surface from the point on the lens surface at the distance r from the optical axis of the lens surface to a tangential plane perpendicular to the optical axis and intersecting a vertex of the lens surface.

The imaging lens system according to the aforementioned example may further include a stop and a filter. As an example, the imaging lens system may further include a stop disposed between the second lens and the third lens. As another example, the imaging lens system may further include a filter disposed between the seventh lens and the imaging plane. The stop may be configured to adjust an amount of light incident on the imaging plane, and the filter may be configured to block light of a specific wavelength or a specific range of wavelengths. The filter may be configured to block infrared light, but the light blocked by the filter is not limited to infrared light.

Hereinafter, examples of the imaging lens system will be described with reference to the drawings.

Figure 2:
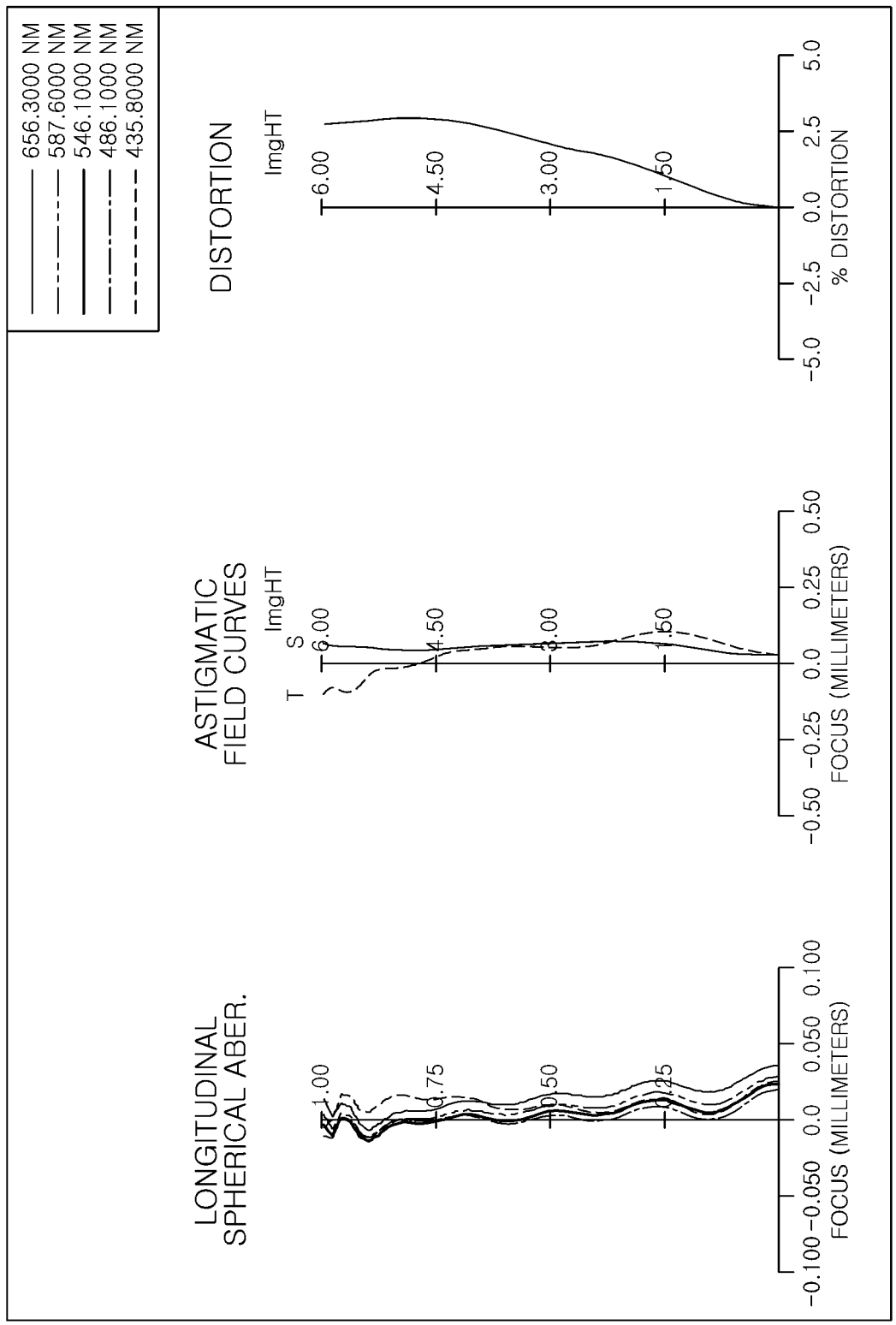
FIG. 2 illustrates aberration curves of the imaging lens system illustrated in FIG. 1.

FIG. 1 is a diagram illustrating a first example of an imaging lens system, and FIG. 2 illustrates aberration curves of the imaging lens system illustrated in FIG. 1.

The imaging lens system 100 may include a first lens 110, a second lens 120, a third lens 130, a fourth lens 140, a fifth lens 150, and a sixth lens 160, and a seventh lens 170.

The first lens 110 may have a positive refractive power, and may have a convex object-side surface and a concave image-side surface. The second lens 120 may have a negative refractive power, and may have a convex object-side surface and a concave image-side surface. The third lens 130 may have a positive refractive power, and may have a concave object-side surface and a convex image-side surface. The fourth lens 140 may have a negative refractive power, and may have a concave object-side surface and a concave image-side surface. The fifth lens 150 may have a positive refractive power, and may have a concave object-side surface and a convex image-side surface. The sixth lens 160 may have a positive refractive power, and may have a convex object-side surface and a concave image-side surface. Both the object-side surface and the image-side surface of the sixth lens 160 may have an inflection point. The seventh lens 170 may have a negative refractive power, and may have a convex object-side surface and a concave image-side surface. Both the object-side surface and the image-side surface of the seventh lens 170 may have an inflection point.

The imaging lens system 100 may further include a stop (not shown), a filter 180, and an imaging plane IP. For example, the stop may be disposed between the second lens 120 and the third lens 130, and the filter 180 may be disposed between the seventh lens 170 and the imaging plane IP. However, the first example is not limited thereto, and the imaging lens system 100 may not include the stop and the filter 180. For example, the stop or the filter 180 may not be provided if desired. The imaging plane IP may be disposed at a position at which light incident through the first lens 110 to the seventh lens 170 is focused. For example, the imaging plane IP may be disposed on one surface of an image sensor IS of the camera module or on an optical element disposed in the image sensor IS.

Tables 1 and 2 below list optical characteristics and aspherical values of the first example of the imaging lens system.

TABLE 1

| Surface No. | Element | Radius of Curvature | Thickness/Distance | Refractive Index | Abbe Number | Effective Radius |
|---|---|---|---|---|---|---|
| S1 | First | 2.322 | 0.854 | 1.546 | 55.990 | 1.680 |
| S2 | Lens | 11.658 | 0.111 | | | 1.603 |
| S3 | Second | 22.194 | 0.272 | 1.679 | 19.238 | 1.546 |
| S4 | Lens | 6.248 | 0.404 | | | 1.396 |
| S5 | Third | −39.374 | 0.365 | 1.571 | 37.403 | 1.372 |
| S6 | Lens | −8.891 | 0.091 | | | 1.385 |
| S7 | Fourth | −36.302 | 0.296 | 1.679 | 19.238 | 1.430 |
| S8 | Lens | 39.404 | 0.479 | | | 1.599 |
| S9 | Fifth | −27.764 | 0.360 | 1.620 | 25.936 | 1.830 |
| S10 | Lens | −22.037 | 0.694 | | | 2.281 |
| S11 | Sixth | 3.932 | 0.681 | 1.546 | 55.990 | 3.536 |
| S12 | Lens | 6.810 | 0.839 | | | 3.862 |
| S13 | Seventh | 6.334 | 0.500 | 1.537 | 55.735 | 4.503 |
| S14 | Lens | 2.103 | 0.236 | | | 4.696 |
| S15 | Filter | Infinity | 0.110 | 1.519 | 64.197 | 5.626 |
| S16 | | Infinity | 0.823 | | | 5.671 |
| S17 | Imaging Plane | Infinity | −0.024 | | | 6.262 |

TABLE 2

| Surface No. | S1 | S2 | S3 | S4 | S5 | S6 | S7 |
|---|---|---|---|---|---|---|---|
| k | −0.510897 | 13.768180 | 72.505571 | 4.250413 | 0.000000 | 23.484321 | 78.995537 |
| A | −0.010104 | 0.010507 | 0.043353 | −0.007939 | −0.015175 | −0.015554 | −0.052274 |
| B | 0.098141 | −0.100201 | −0.356851 | 0.249737 | 0.045101 | −0.052289 | 0.090827 |
| C | −0.364622 | 0.560922 | 2.016395 | −1.826346 | −0.471857 | 0.555912 | −0.526746 |
| D | 0.883544 | −1.994849 | −7.151729 | 7.963301 | 2.780760 | −2.885580 | 2.369654 |
| E | −1.459612 | 4.739195 | 16.952124 | −22.548464 | −10.548721 | 9.270204 | −7.449008 |
| F | 1.704086 | −7.790900 | −27.972545 | 43.650956 | 26.841588 | −20.258618 | 16.161292 |
| G | −1.437145 | 9.076263 | 32.964566 | −59.560377 | −47.287492 | 31.252027 | −24.735957 |
| H | 0.885195 | −7.593422 | −28.116201 | 58.197704 | 58.785435 | −34.553086 | 27.150086 |
| J | −0.398542 | 4.575061 | 17.394742 | −40.858501 | −51.894288 | 27.450635 | −21.464581 |
| L | 0.129784 | −1.967151 | −7.729376 | 20.410796 | 32.307565 | −15.521682 | 12.115351 |
| M | −0.029780 | 0.588687 | 2.403772 | −7.064542 | −13.853369 | 6.090124 | −4.758839 |
| N | 0.004570 | −0.116464 | −0.496604 | 1.605385 | 3.890246 | −1.574877 | 1.234650 |
| O | −0.000421 | 0.013690 | 0.061215 | −0.214501 | −0.643474 | 0.241266 | −0.189993 |
| P | 0.000018 | −0.000724 | −0.003407 | 0.012688 | 0.047488 | −0.016583 | 0.013118 |

| Surface No. | S8 | S9 | S10 | S11 | S12 | S13 | S14 |
|---|---|---|---|---|---|---|---|
| k | 0.000000 | 0.000000 | 0.000000 | −17.084596 | −16.163739 | 0.706176 | −7.059311 |
| A | −0.048581 | −0.058188 | −0.066628 | 0.007787 | 0.008189 | −0.126557 | −0.068345 |
| B | 0.048486 | 0.033110 | 0.026812 | −0.015826 | −0.001479 | 0.052770 | 0.029360 |
| C | −0.103909 | −0.081911 | 0.001190 | 0.006586 | −0.004068 | −0.015640 | −0.010223 |
| D | 0.079561 | 0.313185 | −0.022302 | −0.003171 | 0.002582 | 0.002903 | 0.002719 |
| E | 0.301980 | −0.772915 | 0.030870 | 0.001464 | −0.000855 | −0.000168 | −0.000553 |
| F | −1.217286 | 1.221042 | −0.024632 | −0.000518 | 0.000188 | −0.000057 | 0.000086 |
| G | 2.217461 | −1.304125 | 0.013028 | 0.000129 | −0.000030 | 0.000017 | −0.000010 |
| H | −2.508384 | 0.971756 | −0.004762 | −0.000022 | 0.000003 | −0.000002 | 0.000001 |
| J | 1.902865 | −0.511614 | 0.001218 | 0.000003 | 0.000000 | 0.000000 | 0.000000 |
| L | −0.988457 | 0.189613 | −0.000217 | 0.000000 | 0.000000 | 0.000000 | 0.000000 |
| M | 0.348098 | −0.048385 | 0.000026 | 0.000000 | 0.000000 | 0.000000 | 0.000000 |
| N | −0.079626 | 0.008087 | −0.000002 | 0.000000 | 0.000000 | 0.000000 | 0.000000 |
| O | 0.010691 | −0.000796 | 0.000000 | 0.000000 | 0.000000 | 0.000000 | 0.000000 |
| P | −0.000640 | 0.000035 | 0.000000 | 0.000000 | 0.000000 | 0.000000 | 0.000000 |

Figure 3:
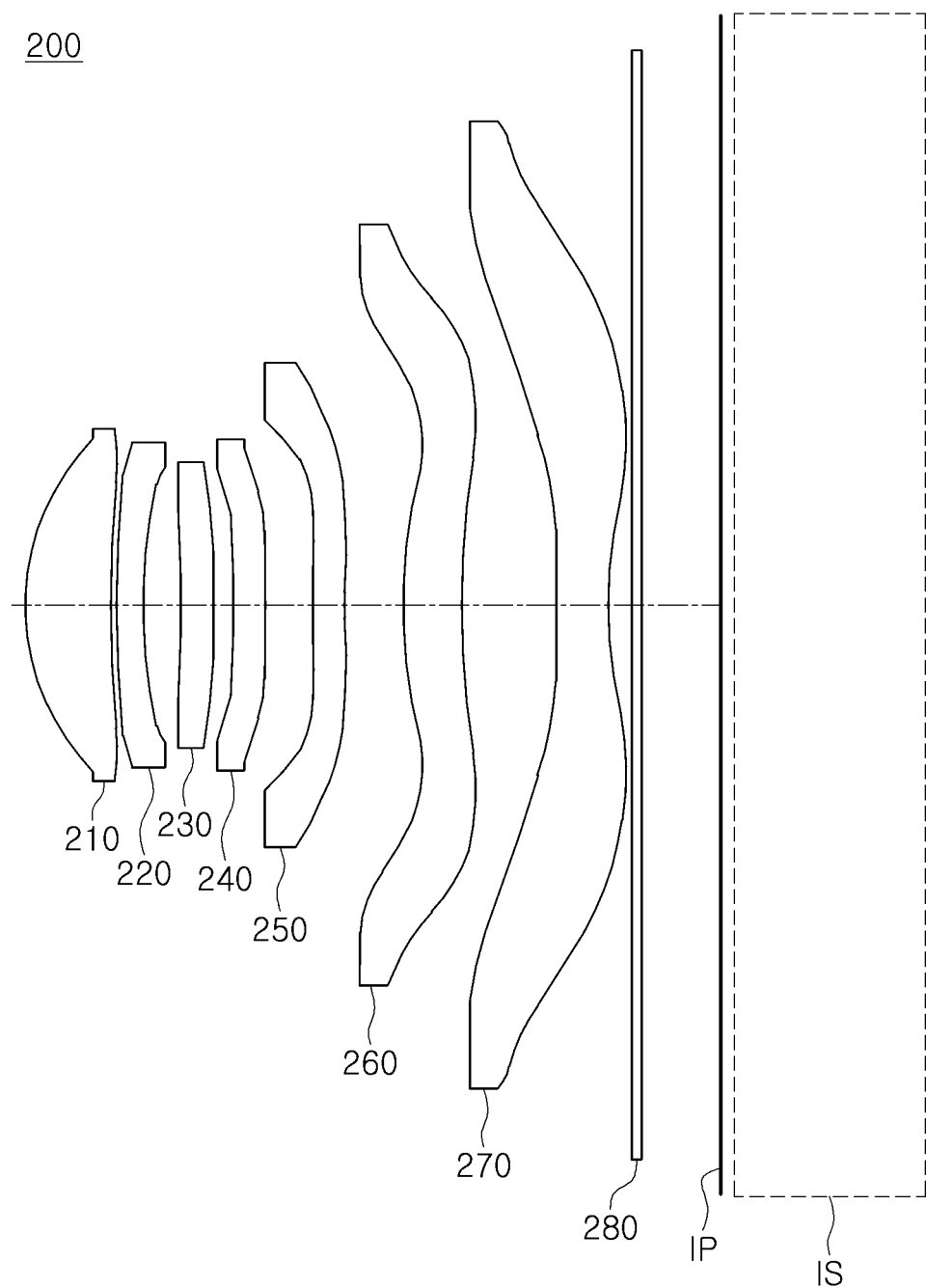
FIG. 3 is a diagram illustrating a second example of an imaging lens system.
Figure 4:
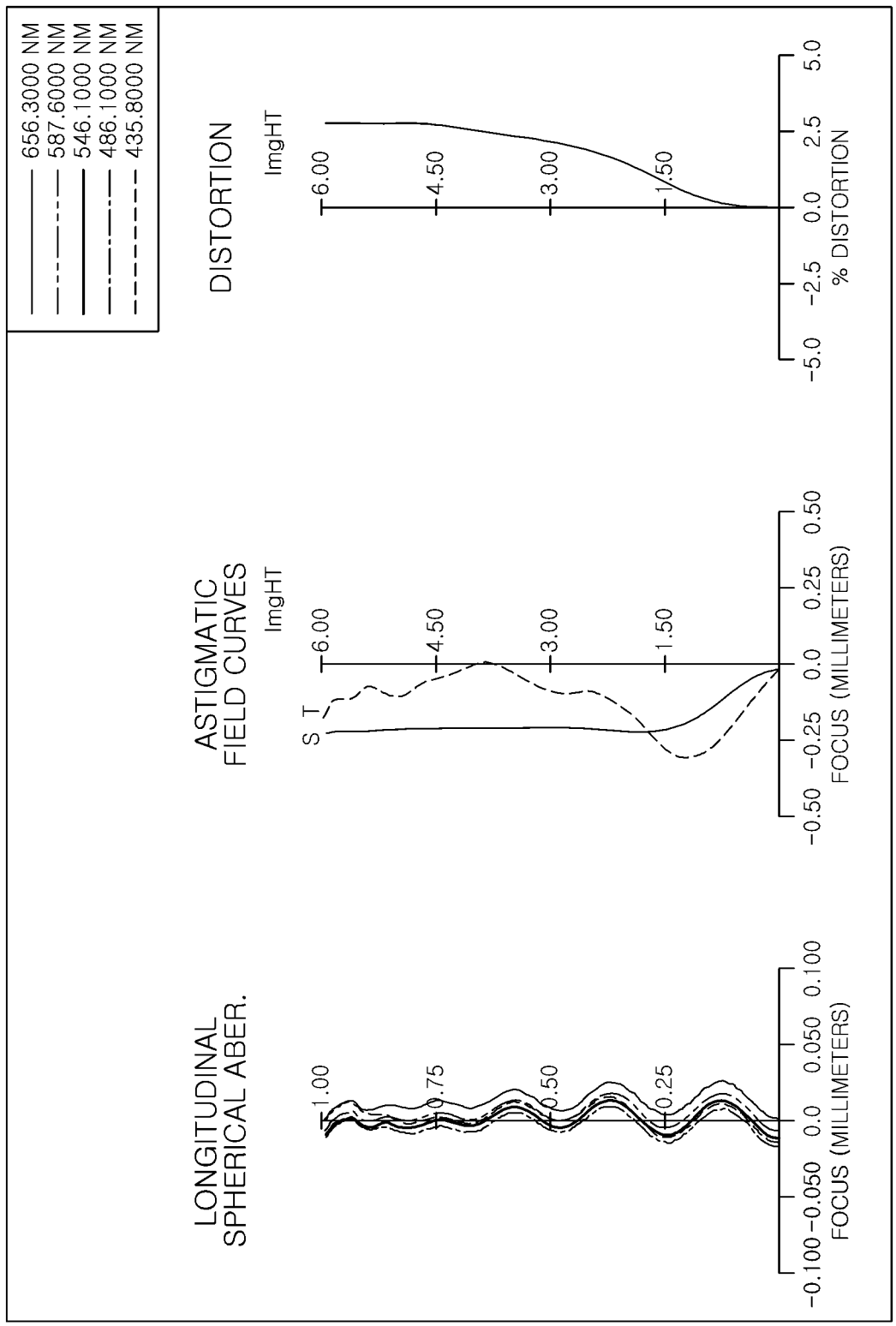
FIG. 4 illustrates aberration curves of the imaging lens system illustrated in FIG. 3.

FIG. 3 is a diagram illustrating a second example of an imaging lens system, and FIG. 4 illustrates aberration curves of the imaging lens system illustrated in FIG. 3.

The imaging lens system 200 may include a first lens 210, a second lens 220, a third lens 230, a fourth lens 240, a fifth lens 250, and a sixth lens 260, and a seventh lens 270.

The first lens 210 may have a positive refractive power, and may have a convex object-side surface and a concave image-side surface. The second lens 220 may have a negative refractive power, and may have a convex object-side surface and a concave image-side surface. The third lens 230 may have a positive refractive power, and may have a concave object-side surface and a convex image-side surface. The fourth lens 240 may have a negative refractive power, and may have a concave object-side surface and a concave image-side surface. The fifth lens 250 may have a negative refractive power, and may have a convex object-side surface and a concave image-side surface. The sixth lens 260 may have a positive refractive power, and may have a convex object-side surface and a concave image-side surface. Both the object-side surface and the image-side surface of the sixth lens 260 may have an inflection point.

The seventh lens 270 may have a negative refractive power, and may have a convex object-side surface and a concave image-side surface. Both the object-side surface and the image-side surface of the seventh lens 270 may have an inflection point.

The imaging lens system 200 may further include a stop (not shown), a filter 280, and an imaging plane IP. For example, the stop may be disposed between the second lens 220 and the third lens 230, and the filter 280 may be disposed between the seventh lens 270 and the imaging plane IP. However, an example thereof is not limited thereto, and the imaging lens system 200 may not include the stop and the filter 280. For example, the stop or the filter 280 may not be provided if desired. The imaging plane IP may be disposed at a position at which light incident through the first lens 210 to the seventh lens 270 is focused. For example, the imaging plane IP may be made on one surface of an image sensor IS of the camera module or on an optical element disposed in the image sensor IS.

Tables 3 and 4 below list optical characteristics and aspherical values of the second example of the imaging lens system.

TABLE 3

| Surface No. | Element | Radius of Curvature | Thickness/Distance | Refractive Index | Abbe Number | Effective Radius |
|---|---|---|---|---|---|---|
| S1 | First | 2.408 | 0.874 | 1.546 | 55.990 | 1.711 |
| S2 | Lens | 15.055 | 0.051 | | | 1.631 |
| S3 | Second | 14.435 | 0.270 | 1.679 | 19.238 | 1.585 |
| S4 | Lens | 5.749 | 0.382 | | | 1.420 |
| S5 | Third | −34.689 | 0.359 | 1.571 | 37.403 | 1.394 |
| S6 | Lens | −12.489 | 0.192 | | | 1.350 |
| S7 | Fourth | −76.695 | 0.320 | 1.668 | 20.377 | 1.420 |
| S8 | Lens | 31.906 | 0.483 | | | 1.586 |
| S9 | Fifth | 9.092 | 0.330 | 1.641 | 23.959 | 1.902 |
| S10 | Lens | 7.232 | 0.594 | | | 2.351 |
| S11 | Sixth | 3.802 | 0.582 | 1.546 | 55.990 | 3.477 |
| S12 | Lens | 13.172 | 0.974 | | | 3.723 |
| S13 | Seventh | 10.110 | 0.505 | 1.537 | 55.735 | 4.470 |
| S14 | Lens | 2.360 | 0.253 | | | 4.702 |
| S15 | Filter | Infinity | 0.110 | 1.519 | 64.197 | 5.610 |
| S16 | | Infinity | 0.797 | | | 5.656 |
| S17 | Imaging Plane | Infinity | 0.012 | | | 6.270 |

TABLE 4

| Surface No. | S1 | S2 | S3 | S4 | S5 | S6 | S7 |
|---|---|---|---|---|---|---|---|
| k | −0.634717 | 2.551979 | 47.386598 | 4.969090 | −98.232437 | 63.605823 | 0.000000 |
| A | 0.021227 | 0.066865 | 0.002639 | 0.082881 | 0.018761 | −0.036150 | 0.026491 |
| B | −0.086548 | −0.590684 | −0.067703 | −0.936894 | −0.275234 | 0.416108 | −0.785551 |
| C | 0.209730 | 2.767052 | 0.311017 | 5.752979 | 1.796930 | −2.765501 | 4.942113 |
| D | −0.158831 | −8.275911 | −1.081336 | −22.165425 | −7.238294 | 11.425459 | −18.769658 |
| E | −0.345405 | 16.715368 | 2.715026 | 57.010537 | 19.154554 | −30.912557 | 47.072293 |
| F | 1.111237 | −23.527648 | −4.676358 | −101.84862 | −34.707260 | 57.029646 | −81.787391 |
| G | −1.519804 | 23.570391 | 5.555517 | 129.515786 | 44.052856 | −73.729272 | 101.090361 |
| H | 1.283037 | −17.006821 | −4.625523 | −118.71684 | −39.534026 | 67.797994 | −90.055748 |
| J | −0.727811 | 8.855724 | 2.722385 | 78.561501 | 25.006436 | −44.485746 | 57.922772 |
| L | 0.283697 | −3.296264 | −1.127699 | −37.142529 | −10.950201 | 20.636374 | −26.621627 |
| M | −0.075223 | 0.855035 | 0.321632 | 12.217832 | 3.190511 | −6.597701 | 8.516259 |
| N | 0.012991 | −0.146781 | −0.060101 | −2.652457 | −0.571606 | 1.380381 | −1.799332 |
| O | −0.001320 | 0.014984 | 0.006617 | 0.341117 | 0.053090 | −0.169820 | 0.225502 |
| P | 0.000060 | −0.000689 | −0.000325 | −0.019650 | −0.001544 | 0.009300 | −0.012689 |

| Surface No. | S8 | S9 | S10 | S11 | S12 | S13 | S14 |
|---|---|---|---|---|---|---|---|
| k | −11.134866 | 0.000000 | 0.000000 | −9.151978 | 9.774567 | −58.794882 | −2.352981 |
| A | −0.081926 | −0.081114 | −0.113411 | −0.002098 | 0.023038 | −0.084616 | −0.094832 |

TABLE 4-continued

| | | | | | | | |
|---|---|---|---|---|---|---|---|
| B | 0.269150 | −0.084891 | 0.076361 | 0.001977 | −0.005425 | 0.035999 | 0.042839 |
| C | −1.270070 | 0.593057 | −0.049757 | −0.011932 | −0.005398 | −0.012392 | −0.015799 |
| D | 4.240135 | −1.592139 | 0.030474 | 0.010668 | 0.004467 | 0.003606 | 0.004447 |
| E | −9.797337 | 2.716277 | −0.013679 | −0.005591 | −0.001843 | −0.000786 | −0.000932 |
| F | 15.909321 | −3.200468 | 0.002579 | 0.001946 | 0.000502 | 0.000122 | 0.000145 |
| G | −18.490235 | 2.684632 | 0.001159 | −0.000467 | −0.000096 | −0.000013 | −0.000017 |
| H | 15.538441 | −1.624894 | −0.001110 | 0.000078 | 0.000013 | 0.000001 | 0.000001 |
| J | −9.447086 | 0.710569 | 0.000447 | −0.000009 | −0.000001 | 0.000000 | 0.000000 |
| L | 4.111231 | −0.222069 | −0.000111 | 0.000001 | 0.000000 | 0.000000 | 0.000000 |
| M | −1.247484 | 0.048284 | 0.000018 | 0.000000 | 0.000000 | 0.000000 | 0.000000 |
| N | 0.250490 | −0.006926 | −0.000002 | 0.000000 | 0.000000 | 0.000000 | 0.000000 |
| O | −0.029895 | 0.000588 | 0.000000 | 0.000000 | 0.000000 | 0.000000 | 0.000000 |
| P | 0.001604 | −0.000022 | 0.000000 | 0.000000 | 0.000000 | 0.000000 | 0.000000 |

Figure 5:
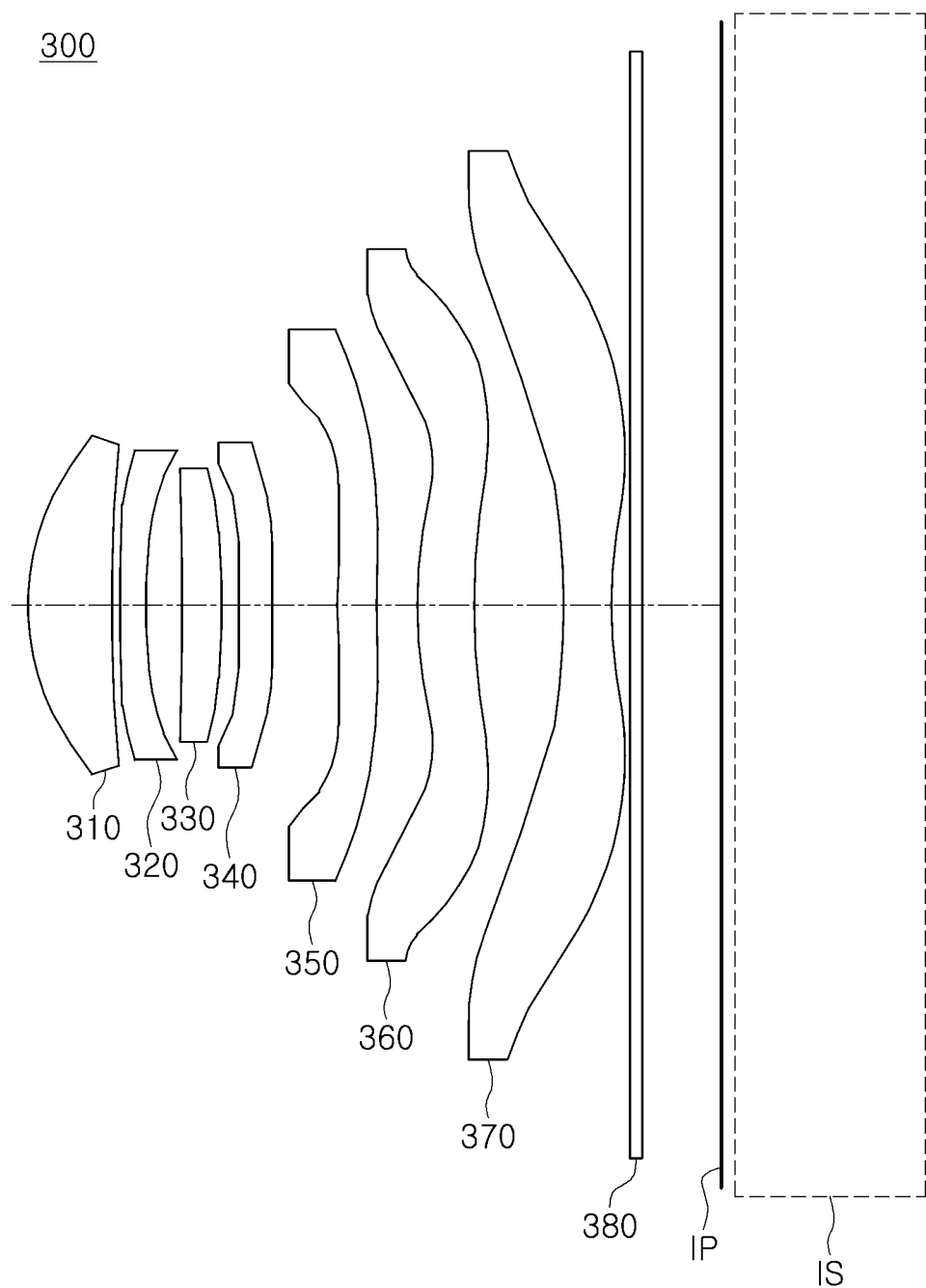
FIG. 5 is a diagram illustrating a third example of an imaging lens system.
Figure 6:
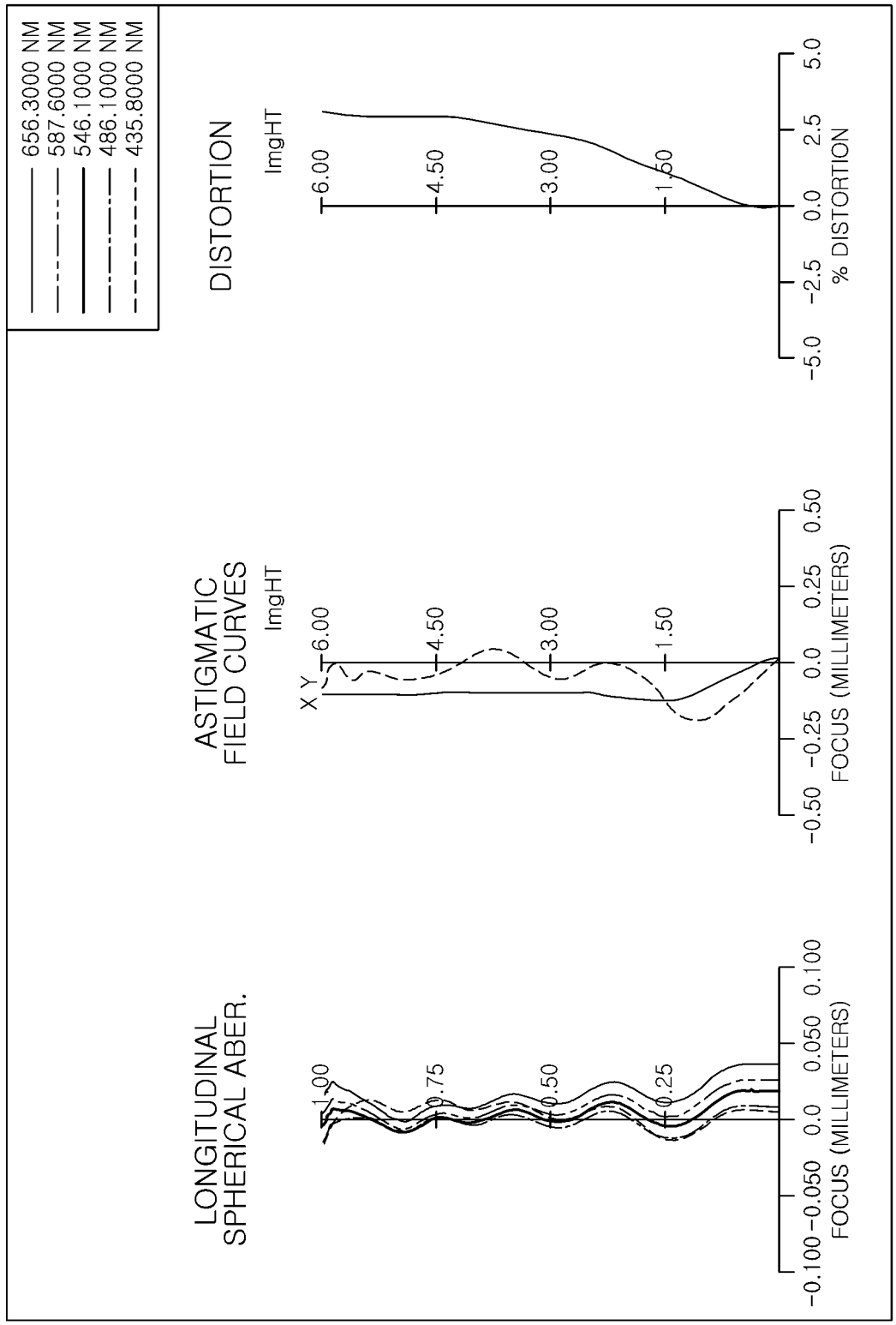
FIG. 6 illustrates aberration curves of the imaging lens system illustrated in FIG. 5.

FIG. 5 is a diagram illustrating a third example of an imaging lens system, and FIG. 6 illustrates aberration curves of the imaging lens system illustrated in FIG. 5.

The imaging lens system 300 may include a first lens 310, a second lens 320, a third lens 330, a fourth lens 340, a fifth lens 350, a sixth lens 360, and a seventh lens 370.

The first lens 310 may have a positive refractive power, and may have a convex object-side surface and a concave image-side surface. The second lens 320 may have a negative refractive power, and may have a convex object-side surface and a concave image-side surface. The third lens 330 may have a positive refractive power, and may have a concave object-side surface and a convex image-side surface. The fourth lens 340 may have a negative refractive power, and may have a convex object-side surface and a concave image-side surface. The fifth lens 350 may have a negative refractive power, and may have a convex object-side surface and a concave image-side surface. The sixth lens 360 may have a positive refractive power, and may have a convex object-side surface and a concave image-side surface. Both the object-side surface and the image-side surface of the sixth lens 360 may have an inflection point.

The seventh lens 370 may have a negative refractive power, and may have a convex object-side surface and a concave image-side surface. Both the object-side surface and the image-side surface of the seventh lens 370 may have an inflection point.

The imaging lens system 300 may further include a stop (not shown), a filter 380, and an imaging plane IP. For example, the stop may be disposed between the second lens 320 and the third lens 330, and the filter 380 may be disposed between the seventh lens 370 and the imaging plane IP. However, the third example thereof is not limited thereto, and the imaging lens system 300 may not include the stop and the filter 380. For example, the stop or the filter 380 may not be provided if desired. The imaging plane IP may be disposed at a position at which light incident through the first lens 310 to the seventh lens 370 is focused. For example, the imaging plane IP may be made on one surface of an image sensor IS of the camera module or on an optical element disposed in the image sensor IS.

Tables 5 and 6 below list optical characteristics and aspherical values of the third example of the imaging lens system.

TABLE 5

| Surface No. | Element | Radius of Curvature | Thickness/Distance | Refractive Index | Abbe Number | Effective Radius |
|---|---|---|---|---|---|---|
| S1 | First | 2.399 | 0.871 | 1.546 | 55.990 | 1.710 |
| S2 | Lens | 12.536 | 0.074 | | | 1.636 |
| S3 | Second | 17.655 | 0.270 | 1.679 | 19.238 | 1.570 |
| S4 | Lens | 6.136 | 0.381 | | | 1.408 |
| S5 | Third | −36.792 | 0.394 | 1.571 | 37.403 | 1.389 |
| S6 | Lens | −11.758 | 0.182 | | | 1.360 |
| S7 | Fourth | 45.116 | 0.329 | 1.657 | 21.536 | 1.425 |
| S8 | Lens | 17.224 | 0.676 | | | 1.657 |
| S9 | Fifth | 9.174 | 0.395 | 1.571 | 37.403 | 2.232 |
| S10 | Lens | 7.179 | 0.407 | | | 2.800 |
| S11 | Sixth | 3.771 | 0.591 | 1.546 | 55.990 | 3.373 |
| S12 | Lens | 15.106 | 0.914 | | | 3.629 |
| S13 | Seventh | 28.819 | 0.470 | 1.537 | 55.735 | 4.360 |
| S14 | Lens | 2.640 | 0.208 | | | 4.614 |
| S15 | Filter | Infinity | 0.110 | 1.519 | 64.197 | 5.591 |
| S16 | | Infinity | 0.835 | | | 5.639 |
| S17 | Imaging Plane | Infinity | −0.018 | | | 6.275 |

TABLE 6

| Surface No. | S1 | S2 | S3 | S4 | S5 | S6 | S7 |
|---|---|---|---|---|---|---|---|
| k | −0.805679 | −32.874432 | 96.803060 | 9.752771 | 0.000000 | 63.457108 | 0.000000 |
| A | 0.009280 | 0.013765 | −0.021121 | 0.034144 | −0.004956 | −0.025771 | 0.019090 |
| B | −0.012159 | −0.177093 | 0.137314 | −0.394268 | −0.120828 | −0.014832 | −1.052001 |
| C | 0.005116 | 0.859671 | −0.710111 | 2.462964 | 1.138476 | 0.247133 | 6.539123 |
| D | 0.104189 | −2.504346 | 2.541644 | −9.391366 | −5.644350 | −0.992443 | −24.610225 |

TABLE 6-continued

| | | | | | | | |
|---|---|---|---|---|---|---|---|
| E | −0.354181 | 4.878402 | −6.098058 | 23.828854 | 17.354874 | 2.655019 | 61.691144 |
| F | 0.598976 | −6.657398 | 10.111070 | −42.008139 | −35.489539 | −5.216149 | −107.73827 |
| G | −0.634794 | 6.520376 | −11.885980 | 52.709979 | 50.187100 | 7.627532 | 134.458892 |
| H | 0.453992 | −4.635296 | 10.049932 | −47.597287 | −50.099391 | −8.233488 | −121.44350 |
| J | −0.225453 | 2.392840 | −6.130769 | 30.924684 | 35.527948 | 6.465091 | 79.507179 |
| L | 0.078048 | −0.886995 | 2.673472 | −14.277291 | −17.761485 | −3.618789 | −37.342095 |
| M | −0.018505 | 0.229857 | −0.812465 | 4.550588 | 6.105153 | 1.399324 | 12.257402 |
| N | 0.002867 | −0.039501 | 0.163386 | −0.946899 | −1.369204 | −0.353909 | −2.668917 |
| O | −0.000262 | 0.004042 | −0.019535 | 0.114961 | 0.179717 | 0.052537 | 0.346301 |
| P | 0.000011 | −0.000186 | 0.001051 | −0.006118 | −0.010420 | −0.003464 | −0.020270 |

| Surface No. | S8 | S9 | S10 | S11 | S12 | S13 | S14 |
|---|---|---|---|---|---|---|---|
| k | −99.000000 | 10.375263 | 3.599462 | −7.888093 | 15.471920 | −43.360409 | −2.534181 |
| A | −0.078025 | −0.044643 | −0.063121 | 0.031208 | 0.063348 | −0.058991 | −0.072255 |
| B | 0.201999 | −0.030067 | −0.025756 | −0.072711 | −0.061262 | −0.007783 | 0.014291 |
| C | −1.077510 | 0.125109 | 0.072335 | 0.063772 | 0.036716 | 0.018137 | 0.000445 |
| D | 3.813858 | −0.221418 | −0.071941 | −0.042397 | −0.016865 | −0.008645 | −0.001086 |
| E | −8.822656 | 0.272391 | 0.047726 | 0.021092 | 0.005889 | 0.002469 | 0.000323 |
| F | 13.904621 | −0.245478 | −0.022951 | −0.007780 | −0.001564 | −0.000487 | −0.000055 |
| G | −15.399332 | 0.162485 | 0.008147 | 0.002101 | 0.000316 | 0.000069 | 0.000006 |
| H | 12.192334 | −0.078698 | −0.002139 | −0.000410 | −0.000048 | −0.000007 | −0.000001 |
| J | −6.933978 | 0.027651 | 0.000412 | 0.000057 | 0.000005 | 0.000001 | 0.000000 |
| L | 2.809754 | −0.006931 | −0.000057 | −0.000006 | 0.000000 | 0.000000 | 0.000000 |
| M | −0.791500 | 0.001203 | 0.000006 | 0.000000 | 0.000000 | 0.000000 | 0.000000 |
| N | 0.147258 | −0.000137 | 0.000000 | 0.000000 | 0.000000 | 0.000000 | 0.000000 |
| O | −0.016263 | 0.000009 | 0.000000 | 0.000000 | 0.000000 | 0.000000 | 0.000000 |
| P | 0.000807 | 0.000000 | 0.000000 | 0.000000 | 0.000000 | 0.000000 | 0.000000 |

Figure 7:
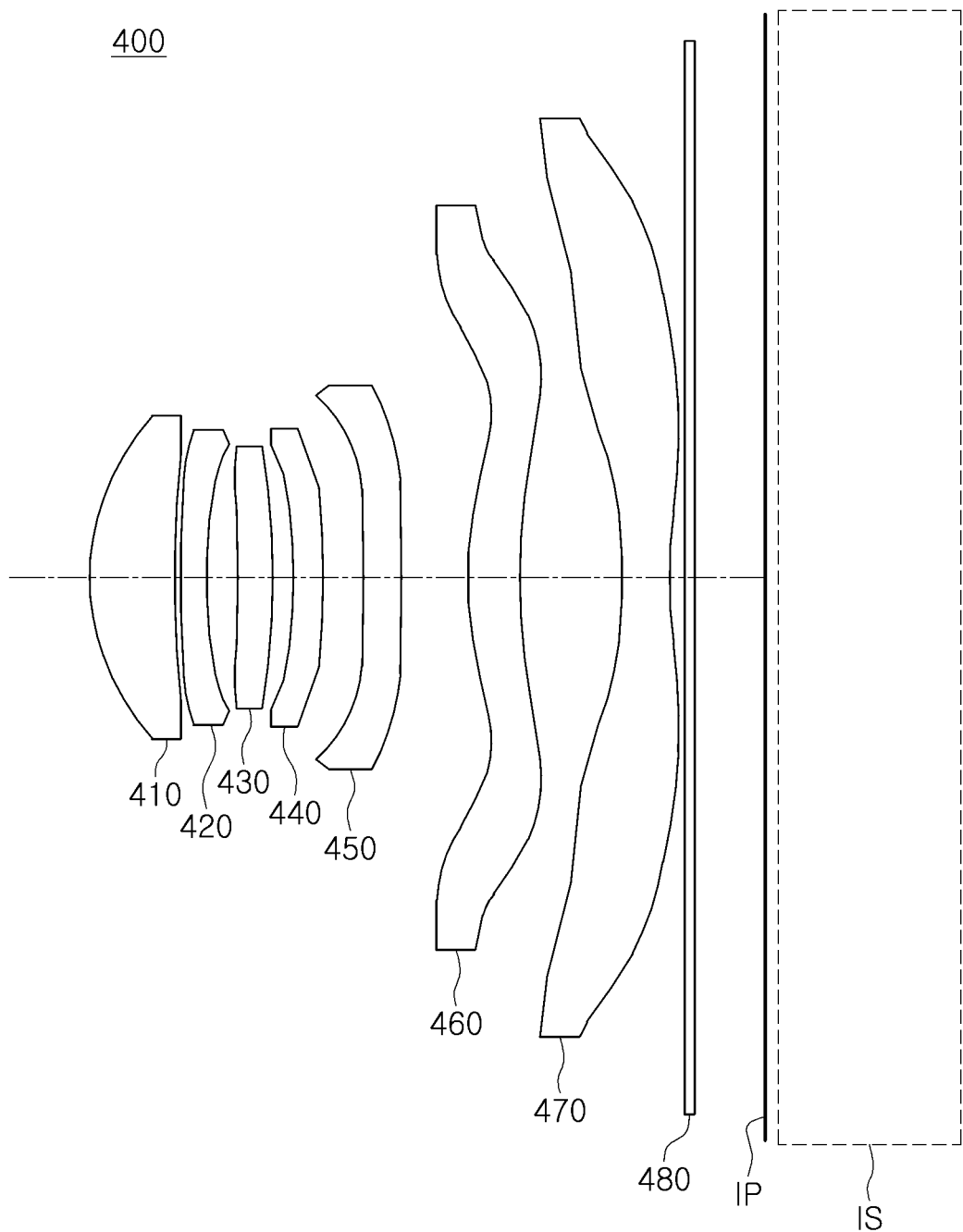
FIG. 7 is a diagram illustrating a fourth example of an imaging lens system.
Figure 8:
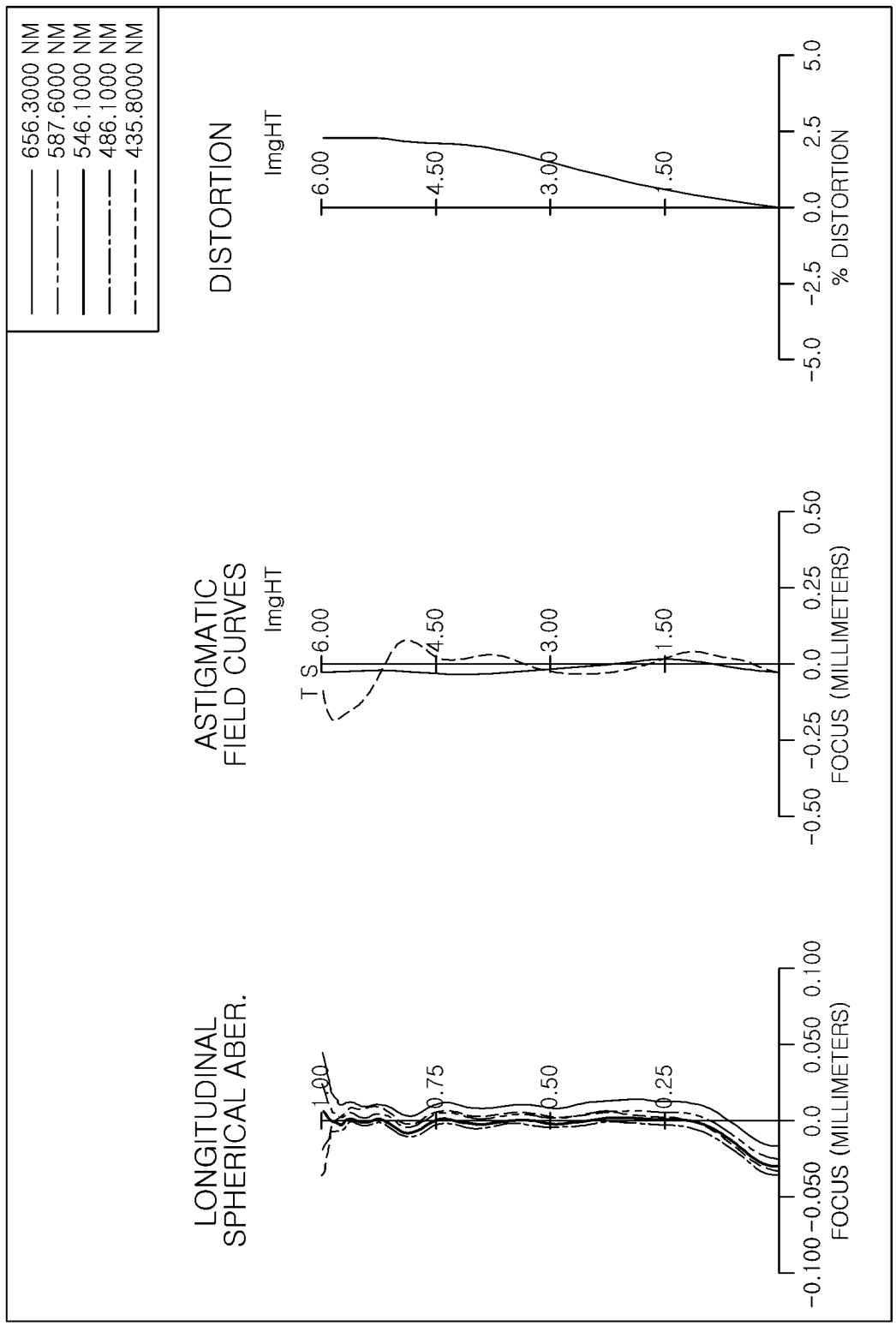
FIG. 8 illustrates aberration curves of the imaging lens system illustrated in FIG. 7.

FIG. 7 is a diagram illustrating a fourth example of an imaging lens system, and FIG. 8 illustrates aberration curves of the imaging lens system illustrated in FIG. 7.

The imaging lens system 400 may include a first lens 410, a second lens 420, a third lens 430, a fourth lens 440, a fifth lens 450, and a sixth lens 460, and a seventh lens 470.

The first lens 410 may have a positive refractive power, and may have a convex object-side surface and a concave image-side surface. The second lens 420 may have a negative refractive power, and may have a convex object-side surface and a concave image-side surface. The third lens 430 may have a positive refractive power, and may have a concave object-side surface and a convex image-side surface. The fourth lens 440 may have a negative refractive power, and may have a concave object-side surface and a convex image-side surface. The fifth lens 450 may have a negative refractive power, and may have a convex object-side surface and a concave image-side surface. The sixth lens 460 may have a positive refractive power, and may have a convex object-side surface and a concave image-side surface. Both the object-side surface and the image-side surface of the sixth lens 460 may have an inflection point.

The seventh lens 470 may have a negative refractive power, and may have a convex object-side surface and a concave image-side surface. Both the object-side surface and the image-side surface of the seventh lens 470 may have an inflection point.

The imaging lens system 400 may further include a stop (not shown), a filter 480, and an imaging plane IP. For example, the stop may be disposed between the second lens 420 and the third lens 430, and the filter 480 may be disposed between the seventh lens 470 and the imaging plane IP. However, the fourth example thereof is not limited thereto, and the imaging lens system 400 may not include the stop and the filter 480. For example, the stop or the filter 480 may not be provided if desired. The imaging plane IP may be disposed at a position at which light incident through the first lens 410 to the seventh lens 470 is focused. For example, the imaging plane IP may be made on one surface of an image sensor IS of the camera module or on an optical element disposed in the image sensor IS.

Tables 7 and 8 below list optical characteristics and aspherical values of the fourth example of the imaging lens system.

TABLE 7

| Surface No. | Element | Radius of Curvature | Thickness/Distance | Refractive Index | Abbe Number | Effective Radius |
|---|---|---|---|---|---|---|
| S1 | First | 2.343 | 0.930 | 1.546 | 55.990 | 1.720 |
| S2 | Lens | 14.429 | 0.050 | | | 1.639 |
| S3 | Second | 18.505 | 0.270 | 1.668 | 20.377 | 1.579 |
| S4 | Lens | 5.881 | 0.345 | | | 1.417 |
| S5 | Third | −26.182 | 0.368 | 1.571 | 37.403 | 1.393 |
| S6 | Lens | −11.911 | 0.209 | | | 1.350 |
| S7 | Fourth | −18.781 | 0.313 | 1.668 | 20.377 | 1.395 |
| S8 | Lens | −284.555 | 0.436 | | | 1.583 |
| S9 | Fifth | 11.914 | 0.400 | 1.641 | 23.959 | 1.884 |
| S10 | Lens | 10.037 | 0.706 | | | 2.314 |
| S11 | Sixth | 3.126 | 0.563 | 1.546 | 55.990 | 3.668 |
| S12 | Lens | 7.066 | 1.069 | | | 3.953 |
| S13 | Seventh | 72.524 | 0.500 | 1.537 | 55.735 | 4.650 |
| S14 | Lens | 2.816 | 0.180 | | | 4.883 |

TABLE 7-continued

| Surface No. | Element | Radius of Curvature | Thickness/Distance | Refractive Index | Abbe Number | Effective Radius |
|---|---|---|---|---|---|---|
| S15 | Filter | Infinity | 0.110 | 1.519 | 64.197 | 5.665 |
| S16 | | Infinity | 0.709 | | | 5.710 |
| S17 | Imaging Plane | Infinity | 0.030 | | | 6.261 |

TABLE 8

| Surface No. | S1 | S2 | S3 | S4 | S5 | S6 | S7 |
|---|---|---|---|---|---|---|---|
| k | −0.730453 | −37.257466 | 98.058633 | 4.915452 | −86.543335 | 67.455905 | 0.000000 |
| A | −0.024681 | −0.006016 | −0.009690 | 0.002629 | 0.031100 | −0.068652 | −0.063597 |
| B | 0.222203 | −0.010423 | 0.029719 | 0.039315 | −0.392679 | 0.750562 | 0.208870 |
| C | −0.924682 | 0.087004 | −0.107517 | −0.722170 | 2.247206 | −4.599034 | −0.685419 |
| D | 2.452730 | −0.277242 | 0.322688 | 4.945650 | −8.069424 | 17.694195 | 0.670067 |
| E | −4.371894 | 0.541956 | −0.694534 | −19.091424 | 19.150603 | −45.496197 | 3.066041 |
| F | 5.438958 | −0.689466 | 1.093565 | 47.109812 | −31.083703 | 81.151900 | −14.545976 |
| G | −4.837853 | 0.574884 | −1.280723 | −78.870039 | 35.074132 | −102.72395 | 31.533567 |
| H | 3.115729 | −0.302034 | 1.121795 | 92.348805 | −27.490010 | 93.344990 | −42.938766 |
| J | −1.455622 | 0.083438 | −0.730151 | −76.526682 | 14.640906 | −60.946523 | 39.594870 |
| L | 0.488386 | 0.002103 | 0.346685 | 44.705185 | −4.987135 | 28.283635 | −25.194532 |
| M | −0.114664 | −0.010641 | −0.116149 | −18.010696 | 0.909981 | −9.084295 | 10.932924 |
| N | 0.017880 | 0.003822 | 0.025917 | 4.762747 | −0.016949 | 1.915777 | −3.095598 |
| O | −0.001663 | −0.000622 | −0.003446 | −0.743940 | −0.023955 | −0.238200 | 0.516262 |
| P | 0.000070 | 0.000041 | 0.000206 | 0.052007 | 0.003042 | 0.013212 | −0.038503 |

| Surface No. | S8 | S9 | S10 | S11 | S12 | S13 | S14 |
|---|---|---|---|---|---|---|---|
| k | −99.000000 | 0.000000 | 0.000000 | −8.879353 | −1.003142 | 24.944796 | −3.558268 |
| A | −0.050984 | −0.090420 | −0.098650 | 0.001580 | 0.003554 | −0.099016 | −0.095078 |
| B | 0.003393 | 0.092737 | 0.077205 | −0.011699 | −0.008227 | 0.041584 | 0.045635 |
| C | 0.330471 | −0.142707 | −0.071604 | 0.011472 | 0.007337 | −0.012379 | −0.017156 |
| D | −1.769358 | 0.223835 | 0.070233 | −0.008230 | −0.004080 | 0.003302 | 0.004945 |
| E | 4.964138 | −0.288742 | −0.062324 | 0.003914 | 0.001410 | −0.000707 | −0.001056 |
| F | −8.965838 | 0.275427 | 0.043898 | −0.001315 | −0.000333 | 0.000111 | 0.000165 |
| G | 11.136061 | −0.193699 | −0.023267 | 0.000316 | 0.000057 | −0.000012 | −0.000019 |
| H | −9.788972 | 0.102589 | 0.009089 | −0.000054 | −0.000007 | 0.000001 | 0.000002 |
| J | 6.149233 | −0.041834 | −0.002581 | 0.000007 | 0.000001 | 0.000000 | 0.000000 |
| L | −2.745085 | 0.013209 | 0.000523 | −0.000001 | 0.000000 | 0.000000 | 0.000000 |
| M | 0.850943 | −0.003142 | −0.000074 | 0.000000 | 0.000000 | 0.000000 | 0.000000 |
| N | −0.174208 | 0.000524 | 0.000007 | 0.000000 | 0.000000 | 0.000000 | 0.000000 |
| O | 0.021189 | −0.000054 | 0.000000 | 0.000000 | 0.000000 | 0.000000 | 0.000000 |
| P | −0.001160 | 0.000002 | 0.000000 | 0.000000 | 0.000000 | 0.000000 | 0.000000 |

Figure 9:
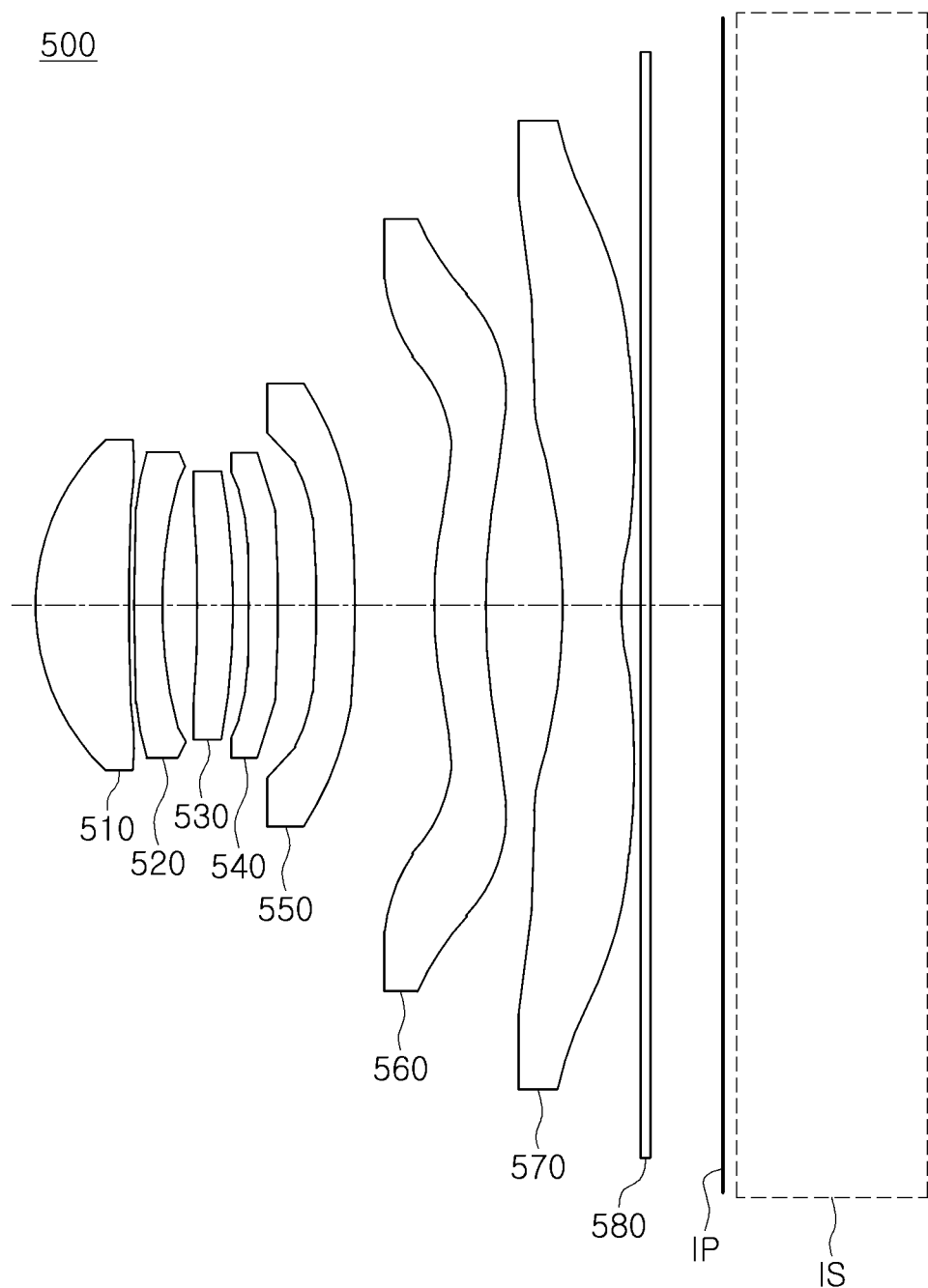
FIG. 9 is a diagram illustrating a fifth example of an imaging lens system.
Figure 10:
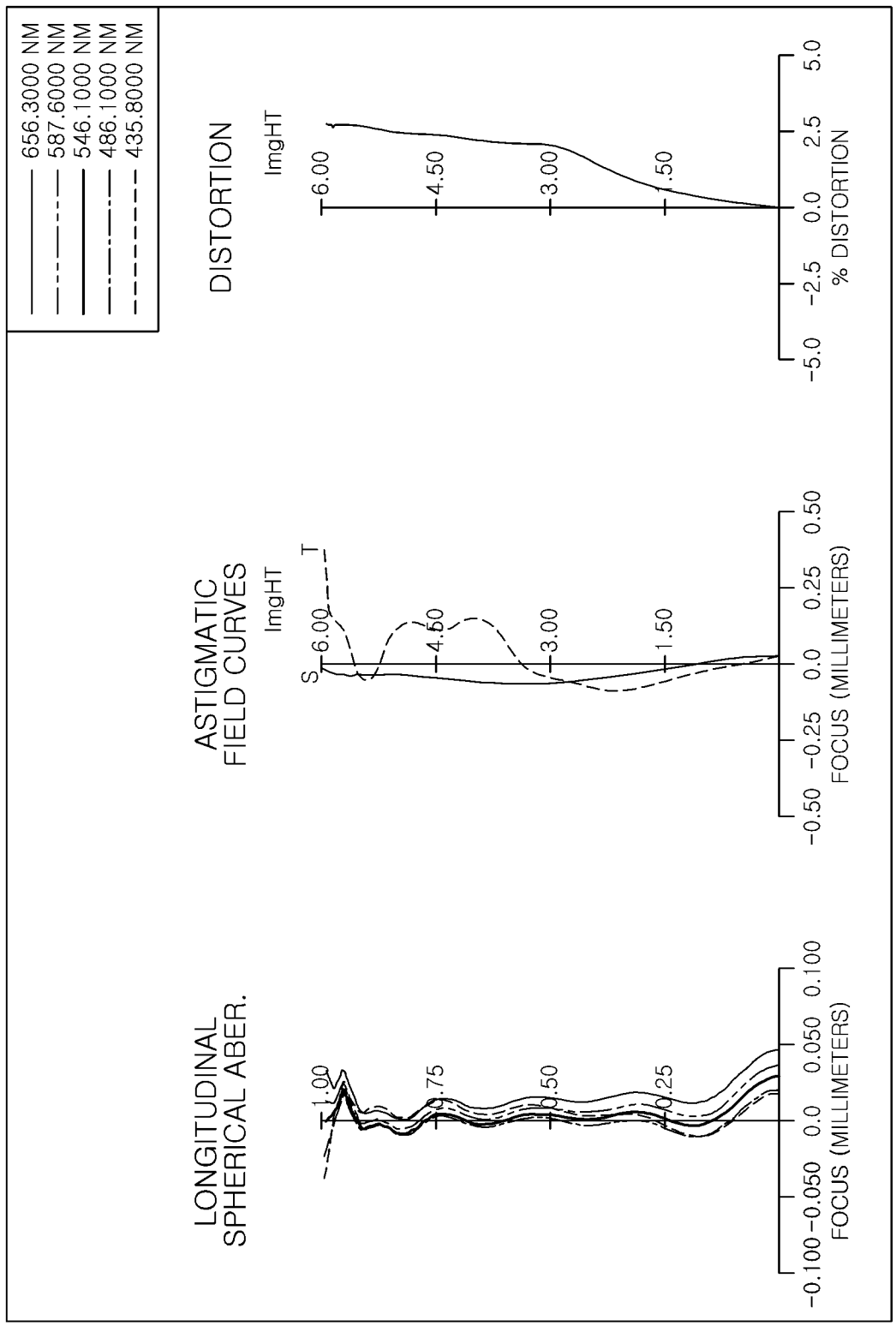
FIG. 10 illustrates aberration curves of the imaging lens system illustrated in FIG. 9.

FIG. 9 is a diagram illustrating a fifth example of an imaging lens system, and FIG. 10 illustrates aberration curves of the imaging lens system illustrated in FIG. 9.

The imaging lens system 500 may include a first lens 510, a second lens 520, a third lens 530, a fourth lens 540, a fifth lens 550, and a sixth lens 560, and a seventh lens 570.

The first lens 510 may have a positive refractive power, and may have a convex object-side surface and a concave image-side surface. The second lens 520 may have a negative refractive power, and may have a convex object-side surface and a concave image-side surface. The third lens 530 may have a positive refractive power, and may have a concave object-side surface and a convex image-side surface. The fourth lens 540 may have a negative refractive power, and may have a concave object-side surface and a concave image-side surface. The fifth lens 550 may have a positive refractive power, and may have a convex object-side surface and a concave image-side surface. The sixth lens 560 may have a positive refractive power, and may have a convex object-side surface and a concave image-side surface. Both the object-side surface and the image-side surface of the sixth lens 560 may have an inflection point.

The seventh lens 570 may have a negative refractive power, and may have a convex object-side surface and a concave image-side surface. Both the object-side surface and the image-side surface of the seventh lens 570 may have an inflection point.

The imaging lens system 500 may further include a stop (not shown), a filter 580, and an imaging plane IP. For example, the stop may be disposed between the second lens 520 and the third lens 530, and the filter 580 may be disposed between the seventh lens 570 and the imaging plane IP. However, the fifth example thereof is not limited thereto, and the imaging lens system 500 may not include the stop and the filter 580. For example, the stop or the filter 580 may not be provided if desired. The imaging plane IP may be disposed at a position at which light incident though the first lens 510 to the seventh lens 570 is focused. For example, the imaging plane IP may be made on one surface of an image sensor IS of the camera module or on an optical element disposed in the image sensor IS.

Tables 9 and 10 below list optical characteristics and aspherical values of the fifth example of the imaging lens system.

TABLE 9

| Surface No. | Element | Radius of Curvature | Thickness/Distance | Refractive Index | Abbe Number | Effective Radius |
|---|---|---|---|---|---|---|
| S1 | First | 2.251 | 0.941 | 1.546 | 55.990 | 1.720 |
| S2 | Lens | 12.244 | 0.050 | | | 1.639 |
| S3 | Second | 16.735 | 0.300 | 1.679 | 19.238 | 1.579 |
| S4 | Lens | 6.366 | 0.352 | | | 1.417 |
| S5 | Third | −15.858 | 0.351 | 1.571 | 37.403 | 1.393 |
| S6 | Lens | −11.704 | 0.163 | | | 1.350 |
| S7 | Fourth | −91.567 | 0.300 | 1.679 | 19.238 | 1.395 |
| S8 | Lens | 27.926 | 0.385 | | | 1.583 |
| S9 | Fifth | 16.113 | 0.400 | 1.646 | 23.491 | 1.884 |
| S10 | Lens | 16.230 | 0.794 | | | 2.314 |
| S11 | Sixth | 3.569 | 0.550 | 1.546 | 55.990 | 3.668 |
| S12 | Lens | 8.259 | 0.777 | | | 3.953 |
| S13 | Seventh | 45.008 | 0.579 | 1.537 | 55.735 | 4.650 |
| S14 | Lens | 2.735 | 0.197 | | | 4.883 |
| S15 | Filter | Infinity | 0.110 | 1.519 | 64.197 | 5.665 |
| S16 | | Infinity | 0.769 | | | 5.710 |
| S17 | Imaging plane Plane | Infinity | −0.030 | | | 6.261 |

TABLE 10

| Surface No. | S1 | S2 | S3 | S4 | S5 | S6 | S7 |
|---|---|---|---|---|---|---|---|
| k | −0.698785 | −50.109564 | 86.943035 | 5.901965 | −88.665265 | 67.124569 | 0.000000 |
| A | −0.017452 | 0.004208 | −0.044227 | 0.002423 | 0.121256 | −0.079015 | −0.055383 |
| B | 0.160709 | −0.197129 | 0.245618 | −0.024726 | −1.580536 | 0.823393 | −0.094448 |
| C | −0.636143 | 1.085758 | −1.204609 | −0.081127 | 10.555083 | −5.188737 | 1.843655 |
| D | 1.639355 | −3.402651 | 4.099615 | 1.694318 | −44.537472 | 20.816923 | −11.062749 |
| E | −2.870976 | 7.035340 | −9.438417 | −8.574712 | 126.751773 | −55.683548 | 38.630942 |
| F | 3.533295 | −10.123208 | 15.108524 | 23.978945 | −253.27809 | 102.906000 | −89.188226 |
| G | −3.123726 | 10.418177 | −17.209223 | −43.181547 | 364.071112 | −134.51621 | 143.272181 |
| H | 2.007137 | −7.770262 | 14.134296 | 53.118465 | −381.09278 | 125.927345 | −164.06096 |
| J | −0.938719 | 4.207356 | −8.393053 | −45.693856 | 290.912103 | −84.561191 | 134.972547 |
| L | 0.316309 | −1.637071 | 3.569863 | 27.529785 | −160.28075 | 40.311621 | −79.254965 |
| M | −0.074810 | 0.445947 | −1.060359 | −11.395557 | 62.088783 | −13.288844 | 32.434905 |
| N | 0.011784 | −0.080719 | 0.208871 | 3.088747 | −16.047845 | 2.874590 | −8.793593 |
| O | −0.001110 | 0.008720 | −0.024518 | −0.493633 | 2.485396 | −0.366455 | 1.420036 |
| P | 0.000047 | −0.000425 | 0.001298 | 0.035248 | −0.174506 | 0.020834 | −0.103434 |

| Surface No. | S8 | S9 | S10 | S11 | S12 | S13 | S14 |
|---|---|---|---|---|---|---|---|
| k | −13.784079 | −13.974345 | 3.251303 | −13.931419 | −3.699948 | 73.036093 | −2.759412 |
| A | −0.068317 | −0.094375 | −0.104353 | 0.008358 | 0.005936 | −0.089221 | −0.089421 |
| B | 0.025185 | −0.013691 | 0.102634 | −0.019784 | −0.021207 | 0.023829 | 0.035537 |
| C | 0.361135 | 0.426724 | −0.158231 | 0.013629 | 0.021402 | 0.001308 | −0.010827 |
| D | −1.926715 | −1.544578 | 0.231806 | −0.006224 | −0.011546 | −0.001900 | 0.002708 |
| E | 5.176312 | 3.280476 | −0.255326 | 0.001693 | 0.003856 | 0.000484 | −0.000541 |
| F | −8.853288 | −4.646719 | 0.202287 | −0.000307 | −0.000871 | −0.000071 | 0.000083 |
| G | 10.286858 | 4.579983 | −0.115443 | 0.000044 | 0.000139 | 0.000007 | −0.000009 |
| H | −8.331125 | −3.202336 | 0.047651 | −0.000006 | −0.000016 | 0.000000 | 0.000001 |
| J | 4.729172 | 1.596056 | −0.014195 | 0.000000 | 0.000001 | 0.000000 | 0.000000 |
| L | −1.859971 | −0.562176 | 0.003017 | 0.000000 | 0.000000 | 0.000000 | 0.000000 |
| M | 0.490675 | 0.136448 | −0.000446 | 0.000000 | 0.000000 | 0.000000 | 0.000000 |
| N | −0.081290 | −0.021667 | 0.000043 | 0.000000 | 0.000000 | 0.000000 | 0.000000 |
| O | 0.007383 | 0.002022 | −0.000003 | 0.000000 | 0.000000 | 0.000000 | 0.000000 |
| P | −0.000260 | −0.000084 | 0.000000 | 0.000000 | 0.000000 | 0.000000 | 0.000000 |

The examples of the imaging lens system described above may include any one or any combination of any two or more of the following features. For example, a focal length of the imaging lens system may be 6.0 to 6.8 mm, a TTL of the imaging lens system may be 6.8 to 7.4 mm, a focal length of the first lens may be 4.6 to 5.6 mm, a focal length of the second lens may be −18 to −10 mm, a focal length of the third lens may be 18 to 80 mm, a focal length of the fourth lens may be −50 to −20 mm, a focal length of the fifth lens may be less than −50 mm or greater than 150 mm, a focal length of the sixth lens may be 7.0 to 18 mm, and a focal length of the seventh lens may be −8.0 to −3.0 mm.

Tables 11 and 12 below list values of parameters and conditional expressions of the first to fifth examples of an imaging lens system.

TABLE 11

| Parameter | First Example | Second Example | Third Example | Fourth Example | Fifth Example |
| --- | --- | --- | --- | --- | --- |
| f-number | 1.890 | 1.890 | 1.890 | 1.890 | 1.890 |
| TTL | 7.090 | 7.090 | 7.090 | 7.190 | 6.990 |
| ImgHT | 6.000 | 6.000 | 6.000 | 6.000 | 6.000 |
| FOV | 85.30 | 85.30 | 85.30 | 85.00 | 85.40 |
| f | 6.360 | 6.324 | 6.332 | 6.377 | 6.350 |
| f1 | 5.141 | 5.122 | 5.270 | 4.985 | 4.887 |
| f2 | −12.898 | −14.253 | −13.986 | −13.012 | −15.315 |
| f3 | 20.034 | 33.993 | 30.106 | 37.935 | 75.944 |
| f4 | −27.788 | −33.675 | −42.580 | −30.102 | −31.490 |
| f5 | 168.263 | −59.262 | −62.309 | −108.359 | 1474.392 |
| f6 | 15.716 | 9.571 | 9.031 | 9.766 | 11.047 |
| f7 | −6.114 | −5.864 | −5.445 | −5.467 | −5.447 |
| Max CRA | 38.200 | 38.400 | 39.900 | 37.500 | 37.200 |

TABLE 12

| Conditional Expression | First Example | Second Example | Third Example | Fourth Example | Fifth Example |
| --- | --- | --- | --- | --- | --- |
| TTL/(2*ImgHT) | 0.5908 | 0.5908 | 0.5908 | 0.5991 | 0.5824 |
| TTL/f | 1.1146 | 1.1211 | 1.1196 | 1.1273 | 1.1007 |
| D34/D67 | 0.1079 | 0.1968 | 0.1988 | 0.1957 | 0.2097 |
| R1/R11 | 0.5905 | 0.6335 | 0.6362 | 0.7497 | 0.6308 |
| (R11 − R12)/(R11 + R12) | −0.2679 | −0.5521 | −0.6005 | −0.3866 | −0.3965 |
| (R3 − R4)/(R3 + R4) | 0.5607 | 0.4303 | 0.4842 | 0.5176 | 0.4488 |
| (R12*D56)/(f*ImgHT) | 0.1238 | 0.2063 | 0.1619 | 0.1304 | 0.1721 |
| (V4 + V5)/V3 | 1.2078 | 1.1854 | 1.5758 | 1.1854 | 1.1424 |

The examples described above may provide an imaging lens system having a wide field of view and a reduced size.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
   a first lens;
   a second lens;
   a third lens having a concave object-side surface in a paraxial region thereof;
   a fourth lens having a concave object-side surface in a paraxial region thereof;
   a fifth lens;
   a sixth lens having a concave image-side surface in a paraxial region thereof; and
   a seventh lens,
   wherein the first to seventh lenses are sequentially disposed in ascending numerical order along an optical axis of the imaging lens system from an object side of the imaging lens system toward an imaging plane of the imaging lens system, and
   the following conditional expressions are satisfied:

$$TTL/(2*ImgHT)<0.6$$

$$0.4<(R3−R4)/(R3+R4)<0.6$$

where TTL is a distance along the optical axis from an object-side surface of the first lens to the imaging plane, 2*ImgHT is a diagonal length of an effective imaging area of the imaging plane, R3 is a radius of curvature on the optical axis of an object-side surface of the second lens, and R4 is a radius of curvature on the optical axis of an image-side surface of the second lens.

2. The imaging lens system of claim 1, wherein a field of view of the imaging lens system is 84 degrees or more.

3. The imaging lens system of claim 1, wherein an f-number of the imaging lens system is less than 1.9.

4. The imaging lens system of claim 1, wherein the following conditional expression is satisfied:

$$0.7<TTL/f<1.2$$

where f is a focal length of the imaging lens system.

5. The imaging lens system of claim 1, wherein the following conditional expression is satisfied:

$$0.1<D34/D67<0.3$$

where D34 is a distance along the optical axis from an image-side surface of the third lens to the object-side surface of the fourth lens, and D67 is a distance along the optical axis from the image-side surface of the sixth lens to an object-side surface of the seventh lens.

6. The imaging lens system of claim 1, wherein the following conditional expression is satisfied:

$$0.4<R1/R11<0.8$$

where R1 is a radius of curvature on the optical axis of the object-side surface of the first lens, and R11 is a radius of curvature on the optical axis of an object-side surface of the sixth lens.

7. The imaging lens system of claim 1, wherein the following conditional expression is satisfied:

$$−0.8<(R11−R12)/(R11+R12)<−0.1$$

where R11 is a radius of curvature on the optical axis of an object-side surface of the sixth lens, and R12 is a radius of curvature on the optical axis of the image-side surface of the sixth lens.

8. The imaging lens system of claim 1, wherein the following conditional expression is satisfied:

$$0.1<(R12*D56)/(f*ImgHT)<0.3$$

where R12 is a radius of curvature on the optical axis of the image-side surface of the sixth lens, D56 is a distance along the optical axis from an image-side surface of the fifth lens to an object-side surface of the sixth lens, f is a focal length of the imaging lens system, and ImgHT is a maximum effective image height on the imaging plane.

9. The imaging lens system of claim 1, wherein the following conditional expression is satisfied:

$$1.0<(V4+V5)/V3<2.0$$

where V3 is an Abbe number of the third lens, V4 is an Abbe number of the fourth lens, and V5 is an Abbe number of the fifth lens.

10. An imaging lens system comprising:
a first lens having a refractive power;
a second lens having a refractive power;
a third lens having a positive refractive power, and a concave object-side surface in a paraxial region thereof;
a fourth lens having a refractive power;
a fifth lens having a refractive power;
a sixth lens having a refractive power; and
a seventh lens having a convex object-side surface in a paraxial region thereof,
wherein the first lens to the seventh lens are sequentially disposed spaced apart from each other in ascending numerical order along an optical axis of the imaging lens system from an object side of the imaging lens system toward an imaging plane of the imaging lens system, and
the following conditional expressions are satisfied:

$$0.7 < TTL/f < 1.2$$

$$0.4 < (R3-R4)/(R3+R4) < 0.6$$

where TTL is a distance along the optical axis from an object-side surface of the first lens to the imaging plane, f is a focal length of the imaging lens system, R3 is a radius of curvature on the optical axis of an object-side surface of the second lens, and R4 is a radius of curvature on the optical axis of an image-side surface of the second lens.

11. The imaging lens system of claim 10, wherein the third lens has a convex image-side surface in a paraxial region thereof.

12. The imaging lens system of claim 10, wherein the fourth lens has a concave object-side surface in a paraxial region thereof.

13. The imaging lens system of claim 10, wherein the fourth lens has a concave image-side surface in a paraxial region thereof.

14. The imaging lens system of claim 10, wherein the fourth lens has a negative refractive power.

15. The imaging lens system of claim 10, wherein the sixth lens has a concave image-side surface in a paraxial region thereof.

16. An imaging lens system comprising:
a first lens;
a second lens;
a third lens;
a fourth lens having a concave object-side surface in a paraxial region thereof;
a fifth lens;
a sixth lens having a concave image-side surface in a paraxial region thereof; and
a seventh lens having a convex object-side surface in a paraxial region thereof,
wherein the first to seventh lenses are sequentially disposed in ascending numerical order along an optical axis of the imaging lens system from an object side of the imaging lens system toward an imaging plane of the imaging lens system, and
the following conditional expressions are satisfied:

$$TTL/(2*ImgHT) < 0.6$$

$$0.4 < (R3-R4)/(R3+R4) < 0.6$$

where TTL is a distance along the optical axis from an object-side surface of the first lens to the imaging plane, 2*ImgHT is a diagonal length of an effective imaging area of the imaging plane, R3 is a radius of curvature on the optical axis of an object-side surface of the second lens, and R4 is a radius of curvature on the optical axis of an image-side surface of the second lens.

17. The imaging lens system of claim 16, wherein a field of view of the imaging lens system is 84 degrees or more.

18. The imaging lens system of claim 16, wherein an f-number of the imaging lens system is less than 1.9.

19. The imaging lens system of claim 16, wherein the following conditional expression is satisfied:

$$0.7 < TTL/f < 1.2$$

where f is a focal length of the imaging lens system.

* * * * *